(12) United States Patent
Manferdelli et al.

(10) Patent No.: US 7,539,875 B1
(45) Date of Patent: May 26, 2009

(54) SECURE REPOSITORY WITH LAYERS OF TAMPER RESISTANCE AND SYSTEM AND METHOD FOR PROVIDING SAME

(75) Inventors: John L. Manferdelli, Redmond, WA (US); Michael David Marr, Sammamish, WA (US); Vinay Krishnaswamy, Woodinville, WA (US); Mariusz H. Jakubowski, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1070 days.

(21) Appl. No.: 09/604,174

(22) Filed: Jun. 27, 2000

(51) Int. Cl.
*H04K 1/00* (2006.01)
*G06F 11/30* (2006.01)
*H04L 9/00* (2006.01)

(52) U.S. Cl. ...................... 713/189; 380/277
(58) Field of Classification Search .............. 713/189; 380/255, 277
See application file for complete search history.

(56) References Cited

U.S. PATENT DOCUMENTS

| | | | |
|---|---|---|---|
| 4,405,829 A | 9/1983 | Rivest et al. | 178/22.1 |
| 4,688,169 A | 8/1987 | Joshi | 364/200 |
| 4,827,508 A | 5/1989 | Shear | 380/4 |
| 4,924,378 A | 5/1990 | Hershey et al. | 713/201 |
| 4,977,594 A | 12/1990 | Shear | 380/4 |
| 5,050,213 A | 9/1991 | Shear | 380/25 |
| 5,191,573 A | 3/1993 | Hair | 369/84 |
| 5,222,134 A | 6/1993 | Waite et al. | 380/4 |
| 5,222,139 A | 6/1993 | Takragi et al. | 380/28 |
| 5,359,659 A | 10/1994 | Rosenthal | 380/4 |
| 5,410,598 A | 4/1995 | Shear | 380/4 |
| 5,509,070 A | 4/1996 | Schull | 380/4 |
| 5,530,235 A | 6/1996 | Stefik et al. | 235/492 |
| 5,625,693 A | 4/1997 | Rohatgi et al. | 380/23 |
| 5,629,980 A | 5/1997 | Stefik et al. | 380/4 |

(Continued)

FOREIGN PATENT DOCUMENTS

EP        0 778 512 A2    6/1997

(Continued)

OTHER PUBLICATIONS

Jaeger, T., "Flexible Control of Downloaded Executable Content", *ACM Transactions on Information and System Security*, 1999, 2(2), 177-228.

*Primary Examiner*—Christopher J Brown
(74) *Attorney, Agent, or Firm*—Woodcock Washburn LLP

(57) ABSTRACT

A secure repository individualized for a hardware environment and a method and system for providing the same. The secure repository includes a hidden cryptographic key and code that applies the key without requiring access to a copy of the key. The code that implements the secure repository is generated in a manner that is at least partly based on a hardware ID associated with the hardware environment in which the secure repository is to be installed, and may also be based on a random number. Cryptographic functions implemented by the secure repository include decryption of encrypted information and validation of cryptographically signed information. The secure repository may be coupled to an application program, which uses cryptographic services provided by the secure repository, by way of a decoupling interface that provides a common communication and authentication interface for diverse types of secure repositories. The decoupling interface may take the form of a single application programmer interface (API) usable with multiple dynamically linkable libraries.

21 Claims, 9 Drawing Sheets

U.S. PATENT DOCUMENTS

| | | | |
|---|---|---|---|
| 5,634,012 A | 5/1997 | Stefik et al. | 395/239 |
| 5,638,443 A | 6/1997 | Stefik et al. | 380/4 |
| 5,654,746 A | 8/1997 | McMullan, Jr. et al. | 725/29 |
| 5,666,411 A | 9/1997 | McCarty | 705/51 |
| 5,675,734 A | 10/1997 | Hair | 395/200.01 |
| 5,682,428 A * | 10/1997 | Johnson | 705/71 |
| 5,708,780 A | 1/1998 | Levergood et al. | 395/200.12 |
| 5,715,403 A | 2/1998 | Stefik | 395/244 |
| 5,724,425 A | 3/1998 | Chang et al. | 380/25 |
| 5,734,823 A | 3/1998 | Saigh et al. | 395/200.06 |
| 5,734,891 A | 3/1998 | Saigh | 395/610 |
| 5,742,677 A | 4/1998 | Pinder et al. | 380/242 |
| 5,758,293 A * | 5/1998 | Frasier | 455/556.2 |
| 5,765,152 A | 6/1998 | Erickson | 707/9 |
| 5,784,609 A | 7/1998 | Kurihara | 707/9 |
| 5,809,145 A | 9/1998 | Slik et al. | 380/25 |
| 5,845,281 A | 12/1998 | Benson et al. | 707/9 |
| 5,850,554 A * | 12/1998 | Carver | 717/162 |
| 5,864,620 A | 1/1999 | Pettitt | 380/4 |
| 5,883,955 A | 3/1999 | Ronning | 380/4 |
| 5,892,899 A * | 4/1999 | Aucsmith et al. | 713/200 |
| 5,892,900 A | 4/1999 | Ginter et al. | 395/186 |
| 5,910,987 A | 6/1999 | Ginter et al. | 380/24 |
| 5,912,972 A * | 6/1999 | Barton | 713/176 |
| 5,915,019 A | 6/1999 | Ginter et al. | 380/4 |
| 5,917,912 A | 6/1999 | Ginter et al. | 380/24 |
| 5,920,861 A | 7/1999 | Hall et al. | 707/9 |
| 5,933,498 A | 8/1999 | Schneck et al. | 380/4 |
| 5,940,504 A | 8/1999 | Griswold | 380/4 |
| 5,949,573 A * | 9/1999 | Glance | 359/326 |
| 5,970,475 A | 10/1999 | Barnes et al. | 705/27 |
| 5,983,273 A | 11/1999 | White et al. | 709/229 |
| 5,991,399 A * | 11/1999 | Graunke et al. | 380/279 |
| 5,991,402 A | 11/1999 | Jia et al. | 705/59 |
| 5,999,622 A | 12/1999 | Yasukawa et al. | 380/4 |
| 6,006,332 A | 12/1999 | Rabne et al. | 713/201 |
| 6,021,492 A | 2/2000 | May | 713/200 |
| 6,029,046 A | 2/2000 | Khan et al. | 725/31 |
| 6,035,403 A | 3/2000 | Subbiah et al. | 713/201 |
| 6,067,582 A | 5/2000 | Smith et al. | 710/5 |
| 6,088,717 A | 7/2000 | Reed et al. | 709/201 |
| 6,138,236 A * | 10/2000 | Mirov et al. | 726/26 |
| 6,199,053 B1 | 3/2001 | Herbert et al. | 705/76 |
| 6,226,618 B1 | 5/2001 | Downs et al. | 705/1 |
| 6,298,446 B1 | 10/2001 | Schreiber et al. | 713/201 |
| 6,301,361 B1 * | 10/2001 | Mischenko et al. | 380/28 |
| 6,331,865 B1 | 12/2001 | Sachs et al. | 345/776 |
| 6,385,596 B1 | 5/2002 | Wiser et al. | 705/51 |
| 6,425,017 B1 | 7/2002 | Dievendorff et al. | 709/315 |
| 6,449,645 B1 | 9/2002 | Nash | 709/224 |
| 6,553,494 B1 * | 4/2003 | Glass | 713/186 |
| 6,606,604 B1 | 8/2003 | Dutta | 705/26 |
| 6,629,138 B1 | 9/2003 | Lambert et al. | 709/224 |
| 6,643,775 B1 * | 11/2003 | Granger et al. | 713/190 |
| 6,715,079 B1 * | 3/2004 | Maytal et al. | 713/194 |
| 6,718,361 B1 | 4/2004 | Basani et al. | 709/201 |
| 6,958,162 B2 * | 10/2005 | Lyu et al. | 424/725 |
| 2001/0011238 A1 | 8/2001 | Eberhard et al. | 705/27 |
| 2002/0002611 A1 | 1/2002 | Vange | 709/223 |
| 2002/0069265 A1 | 6/2002 | Bountour et al. | 709/219 |
| 2002/0178412 A1* | 11/2002 | Matsui | 714/718 |

FOREIGN PATENT DOCUMENTS

| | | |
|---|---|---|
| EP | 0 795 809 A2 | 9/1997 |
| EP | 0 843 449 A2 | 5/1998 |
| WO | WO 96/24092 | 8/1996 |
| WO | WO 96/42041 | 12/1996 |
| WO | WO 98/44402 | 10/1998 |
| WO | WO 98/45768 | 10/1998 |
| WO | WO 98/58306 | 12/1998 |
| WO | WO 99/01815 | 1/1999 |
| WO | WO 99/26123 | 5/1999 |
| WO | WO 99/45491 | 9/1999 |
| WO | WO 99/55055 | 12/1999 |
| WO | WO 99/63416 | 12/1999 |
| WO | WO 00/08909 | 2/2000 |
| WO | WO 00/21239 | 4/2000 |
| WO | WO 00/75760 A1 | 12/2000 |

* cited by examiner

SECURE REPOSITORY WITH LAYERS OF TAMPER RESISTANCE AND SYSTEM AND METHOD FOR PROVIDING SAME

FIELD OF THE INVENTION

The present invention relates generally to the field of computer security and, more particularly, to a secure repository with layers of tamper resistance, and a system and method for providing such a repository.

BACKGROUND OF THE INVENTION

In the field of computer security, one enduring problem is to create a system that allows an owner of information to electronically distribute the information throughout the world while regulating use of that information on remote hardware over which the information owner has no control. For example, information may be delivered to an end user in encrypted form with the ultimate goal that it be viewed (but not copied or otherwise misused) by the end user. The information requires a key in order to be decrypted, but it may not be desirable to give the end user unfettered access to the key because the user could then copy the decrypted information and disseminate it at will.

One solution is not to provide the key directly, but to provide the key to the end user in the form of software that applies the key (or that performs some other sensitive function to be hidden from the user). Such software may contain various types of protection designed to complicate or resist attempts to analyze or misuse the software or the secrets that the software is designed to protect. However, the drawback to this solution is that attempts to create "secure" software incorporating such resistance have so far proven ineffective, as such software has invariably been misused, ported to unauthorized installations, or broken in one way or another. A further drawback is that if technology advances to permit greater protection to be built into the software, it is not always possible to "renew" the security technology by replacing an old unit of "secure" software with a new one.

In view of the foregoing, there is a need for a system that overcomes the limitations and drawbacks of the prior art.

SUMMARY OF THE INVENTION

The present invention provides advantageous systems and methods for creating and using a software-based secure repository. A black box provided herein is an exemplary secure repository that uses cryptographic techniques, preferably public/private key techniques, to perform decryption and authentication services in a secure manner that resists discovery of secret keys used by the cryptographic techniques.

A secure repository according to the invention, such as the exemplary "black box" provided herein, functions as the trusted custodian of one or more cryptographic keys. It performs cryptographic functions such as using a cryptographic key to decrypt information. A user who wishes to use encrypted information is provided with a black box that incorporates the key needed to decrypt the information. The black box contains code that applies the key without actually representing the key in memory, thus shielding the key from discovery by the user. Preferably, the information is encrypted with a public key pair that is unique (or substantially unique) to the user, and each user obtains a unique black box that applies that particular user's private key. The black box may provide the decrypted information to other software modules which the black box trusts not to misuse the information or to divulge it in an unauthorized way. The black box may use cryptographic authentication techniques to establish trust with these other software modules.

In order to obtain the black box, the user's computer contacts a black box server, preferably via a network, and uploads a hardware identifier associated with the computer. The black box server creates an "individualized" black box which contains code to apply a particular cryptographic key, where the code (as well as other code contained in the black box) is based on, and preferably bound to, the hardware identifier. The black box server may introduce various types of protections into the code, such as diversionary code, integrity checks, inline encryption, obfuscated execution, code reorganization, and self-healing code. The black box server then downloads an executable file or executable library containing the black box for installation on the user's computer.

In a preferred embodiment, the black box interfaces with an application program for which it provides secure functions by way of a decoupling interface that makes the details of the black box transparent to the developer of the application program. The decoupling interface may, for example, be an application programmer interface (API) usable with multiple dynamic-link libraries (DLLs), where a different DLL is linked to the application program at runtime depending on which black box is being used. A new DLL may be created for a new black box that did not exist at the time the application program was created. The use of a decoupling interface in this manner supports a "renewable" model of security—i.e., the black box can be replaced if it has been found to be defective or unsecure, or if later technological developments permit the creation of an even more secure black box. The DLL that implements the decoupling interface is an example of a software module that may be authenticated by the black box.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Overview

Modern computing and network technology has permitted widespread and low-cost electronic distribution of information. One feature of electronic information is that it is easily copyable and, once it has been delivered to a computer, the operator of that computer may use and disseminate the information in ways that are neither contemplated by, nor consistent with the commercial interests of, the owner of the information. A secure repository may be used to control the use of information on hardware over which the information's owner otherwise has no control.

Computing Environment

Figure 1:
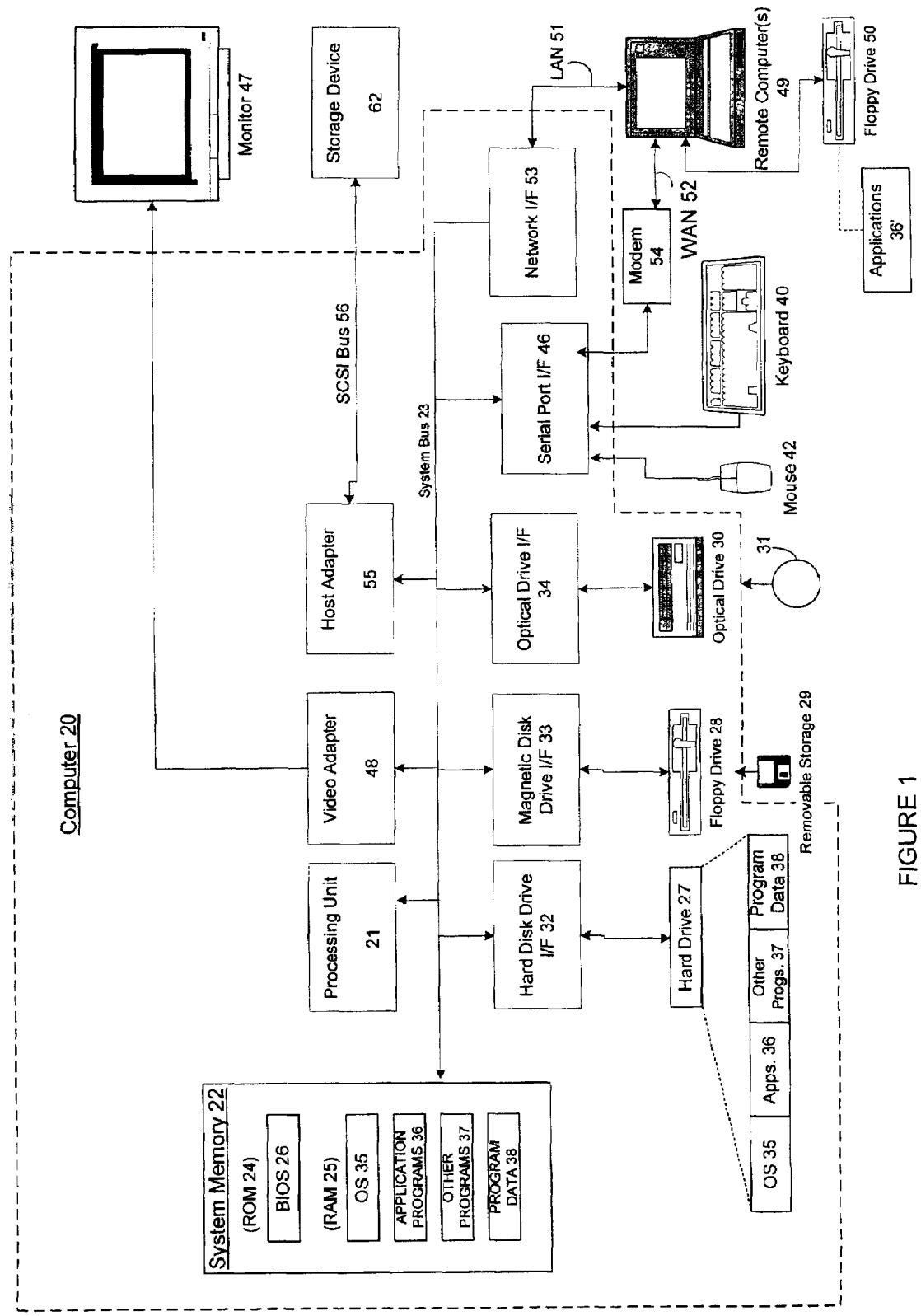
FIG. 1 is a block diagram showing an exemplary computing environment in which aspects of the invention may be implemented.

As shown in FIG. 1, an exemplary system for implementing the invention includes a general purpose computing device in the form of a conventional personal computer or network server 20 or the like, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer or network server 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer or network server 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., WINDOWS® 2000, WINDOWS NT®, or WINDOWS® 95/98), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus 23, but may be connected by other interfaces, such as a parallel port, game port, universal serial bus (USB), or a 1394 high-speed serial port. A monitor 47 or other type of display device is also connected to the system bus 23 via an interface, such as a video adapter 48. In addition to the monitor 47, personal computers typically include other peripheral output devices (not shown), such as speakers and printers.

The personal computer or network server 20 may operate in a networked environment using logical connections to one or more remote computers, such as a remote computer 49. The remote computer 49 may be another personal computer, another network server, a router, a network PC, a peer device or other common network node, and typically includes many or all of the elements described above relative to the personal computer 20, although only a memory storage device 50 has been illustrated in FIG. 1. The logical connections depicted in FIG. 2 include a local area network (LAN) 51 and a wide area network (WAN) 52. Such networking environments are commonplace in offices, enterprise-wide computer networks, Intranets and the Internet.

When used in a LAN networking environment, the personal computer or network server 20 is connected to the local network 51 through a network interface or adapter 53. When used in a WAN networking environment, the personal computer or network server 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer or network server 20, or portions thereof, may be stored in the remote memory storage device 50. It will be appreciated that the network connections shown are exemplary and other means of establishing a communications link between the computers may be used.

Exemplary Use of a Secure Repository

Figure 2:
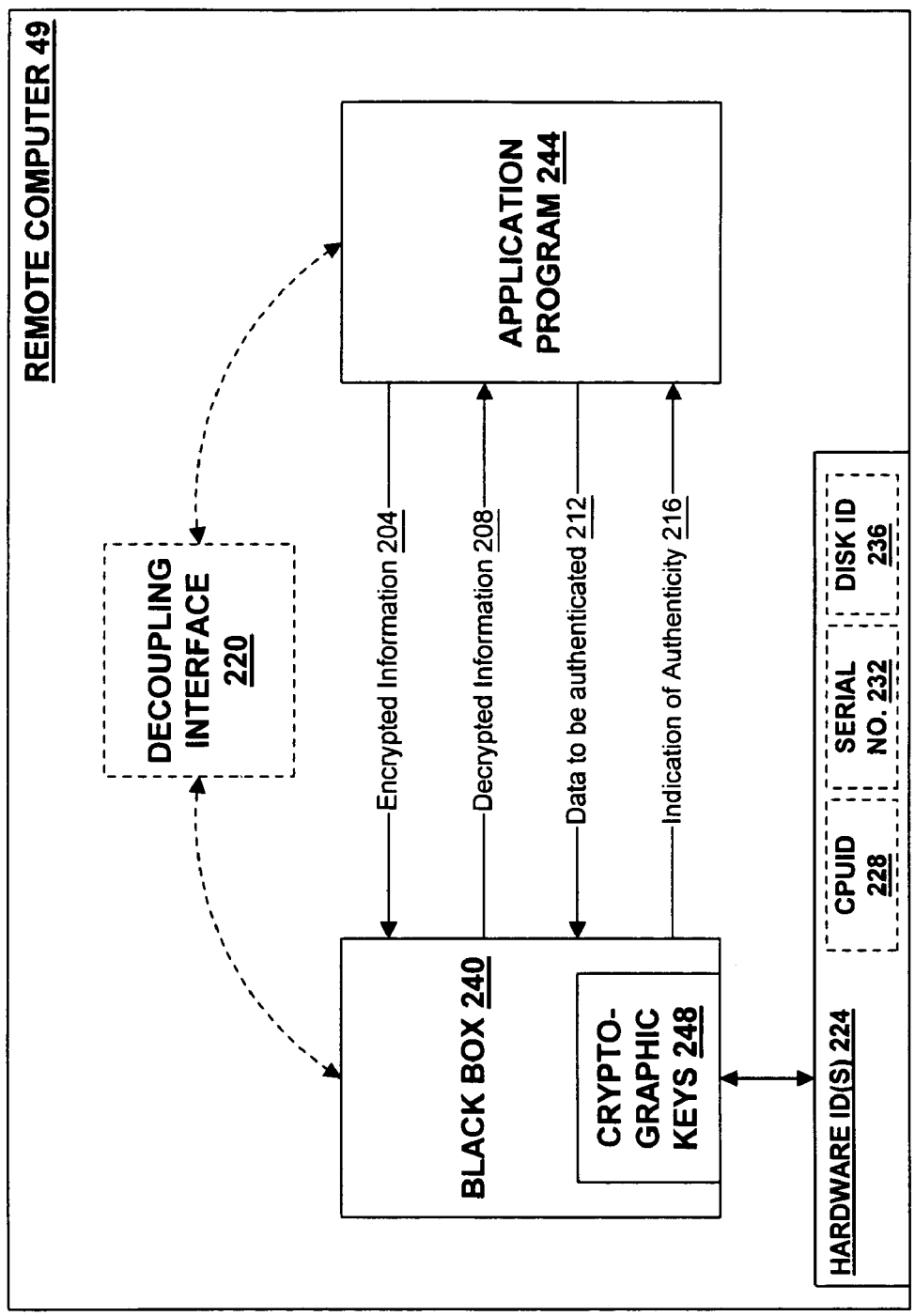
FIG. 2 is a block diagram showing an exemplary use of a preferred type of secure repository.

Referring now to FIG. 2, there is shown an exemplary use of a secure repository in connection with remote computer 49. Remote computer 49 is a computer that may be able to receive information from other computers, for example by means of wide-area network 52 (which may be or comprise the network known as the Internet), local-area network 51, or physical delivery on media such as removable magnetic disk 29 or optical disk 31. Remote computer 49 typically is not in the control or dominion of the owner/provider of such information, and thus a secure repository, such as black box 240, may be used to control the use of information on a computer 49 over which the owner/provider of the information otherwise has no control.

Black box 240 is an exemplary embodiment of a secure repository. Black box 240 comprises code which executes on the general processing means provided by remote computer 49 (which may be analogous to the processing means of computer 20 depicted in FIG. 1, including, but not limited to, processing unit 21). Black box 240 is preferably equipped with one or more cryptographic keys 248, and contains code to use the cryptographic keys to perform on or more cryptographic functions, such as decryption of encrypted information 204, and/or authentication of cryptographically signed data 212. In an exemplary embodiment, cryptographic keys 248 include asymmetric key pairs for use with public/private-key cryptographic methods. Preferably, black box 240 also contains code that is designed to ensure that black box 240 performs its cryptographic functions only for trusted software, and in an environment that resists divulgence of sensitive results or attacks on black box 240 itself. It will be appreciated by those of skill in the art that decryption and authentication are merely exemplary, and not limiting, of the type of secure or sensitive functions that could be performed by a secure repository, such as black box 240. Secure repositories that perform other functions may be installed or employed on remote computer 49, without departing from the spirit and scope of the invention.

Application program 244 is a software program that also executes on remote computer 49. FIG. 2 depicts an example where black box 240 performs decryption and/or authentication services for application program 244, which is a program that in some way processes or uses information. In this example, application program 244 provides encrypted information 204 to black box 240. Black box 240, in turn, decrypts encrypted information 204 (e.g., by using one or more cryptographic key(s) 248) and returns decrypted information 208 to application program 244. Similarly, application program 244 may call upon black box 240 to authenticate an item of data 212, and black box 240 may determine the authenticity of data 212 (e.g., by using one or more cryptographic key(s) 248) and may optionally provide to application program 244 an indication 216 of whether data 212 is authentic. Encrypted information 204 may, for example, be textual information (e.g., a novel), digital audio (e.g. music), digital video (e.g., a movie), financial data, software, or any other type of information (confidential or otherwise). Data 212 to be authenticated may comprise a signed certificate or other signed information. In a typical use, data 212 includes a certificate attesting to black box 240 that application program 244 is a sufficiently trustworthy program (i.e., that application program 244 can be trusted to handle decrypted information 208 without violating rules applying to the usage of decrypted information 208). Data 212 could also comprise a signed "license" to use decrypted information 208, and black box 240 (or trusted decoupling interface 220 (see below)) may authenticate the signed license to verify that the license is not actually a forgery that has been proffered by a user to gain unauthorized access to decrypted information 208. Depending on the nature of encrypted information 204, application program 244 may be a text-rendering program (i.e., a program that enables the reading of electronically-distributed encrypted text by displaying the text as print characters on a monitor), a video-rendering program, an audio-rendering program, or any other type of program that is capable of processing decrypted information 208 in some manner (or that, for any reason, needs to authenticate cryptographically signed information). It will be appreciated that the arrangement shown in FIG. 2 is particularly advantageous, because it allows application program 244 to make use of cryptographic services (i.e., decryption and authentication), without having to know the details of how those cryptographic services are performed, or the particular key(s) 248 that are used to perform them.

Associated with remote computer 49 are one or more hardware IDs 224. A hardware ID 224 comprises data that identifies, or otherwise relates to, particular hardware associated with remote computer 49. Preferably, hardware ID 224 comprises one or more of the following component IDs: CPUID 228, processor serial number 232, and hard disk ID 236. CPUID 228 may be a unique (or substantially unique) pseudo-random number assigned to a central processing unit (CPU) (not shown) of remote computer 49 by the manufacture of such CPU. CPUID 228 may be retrievable by executing an instruction on such CPU that provides the CPUID to a running program. Processor serial number 232 may be a sequentially-assigned number associated with a CPU (or other processor) of remote computer 49, which may also be retrievable by executing an instruction on such CPU. Some processors may have both a CPUID 228 and a serial number 232; other processors may have only one but not the other. Hard disk ID 236 may be a number assigned (e.g., pseudo-randomly or sequentially) to a hard disk (not shown) associated with remote computer 49. Hard disk ID 236 may be assigned by the manufacturer or distributor of such hard disk, and may be stored in an accessible location on such hard disk. A function of hardware ID 224 is to provide a number that is uniquely (or substantially uniquely) associated with remote computer 49. Preferably, hardware ID 224 is based on all of the following component IDs: CPUID 228, serial number 232, and hard disk ID 236. However, hardware ID 224 may be based on a subset of those component IDs, or on entirely different component IDs (which may related to different hardware of remote computer 49, or, perhaps, to the serial number of an operating system (not shown) installed on remote computer 49). Moreover, hardware ID 224 may comprise the entirety of the component IDs on which it is based (e.g., a concatenation of the component IDs), a subset of those component IDs (e.g., the rightmost sixteen bits from each component ID), or may be derived by a function that generates hardware ID 224 based on the component IDs (e.g., the multiplicative product of a plurality of component IDs modulo $2^{32}$). It is also possible to use one of the component IDs itself as a hardware ID 224; for example, hardware ID 224 could simply be equal to CPUID 228. Preferably, hardware ID 224 cannot easily be retrieved or derived in an environment other than remote computer 49, such that a program can be constructed that relies on retrieving hardware ID 224 from the execution environment during execution, thus binding the program to remote computer 49. Hardware ID(s) 224 may be created/determined in any manner that in some way relates to the hardware and/or environment of remote computer 49, without departing from the spirit and scope of the invention. Additionally, remote computer 49 may have a plurality of hardware IDs 224, with each hardware ID 224 being based on different component IDs, or on a different function of the same component IDs.

Black box 240 may access hardware ID(s) 224, and may use hardware ID(s) 224 in order to perform computations relating to its functions. For example, in the course of performing a function such as decryption, black box 240 may need to use a number n. Instead of storing n directly, black box 240 may store n minus the value of a hardware ID 224. In this case, in order to use the number n, black box 240 would contain code that that retrieves or computes hardware ID 224 and adds it to the stored value to create n. This has the effect of "binding" black box 240 to a particular remote computer 49, since it needs a value that can only be accessed on remote computer 49. As a simple example, if hardware ID 224 is equal to CPUID 228, black box 240 could execute an instruction to retrieve CPUID 228 and add it to the stored value. In this case, the instruction will not produce the correct value n unless black box 240 is executing on the remote computer 49 that has the correct CPUID 228.

It should be noted that black box 240 is designed not merely to perform sensitive functions in a hidden and protected manner, but also to ensure that the sensitive results that it produces cannot escape to an untrusted software module—which means in practice that black box 240 performs the function of authenticating other software modules that are part of the secure environment in which black box 240 operates. Preferably, black box 240 authenticates every such software module. In general, each such software module maintains, in a known place, a signed hash of its code, where the signature is generated with a private key. Cryptographic keys 248 may include the corresponding public key which may be used by black box 240 to verify such signatures and establish trust with those software modules.

Black box 240 may communicate directly with application program 244, or, alternatively, it may communicate through decoupling interface 220. Decoupling interface 220 is essentially an intermediary by way of which black box 240 and application program 244 may communicate using a common language or protocol. The use of decoupling interface 220 may improve the versatility of a distribution system that uses black box 240, since it allows application program 244 to communicate with different types of black boxes 240, and allows black box 240 to communicate with different types of application programs 244. Additionally, decoupling interface 220 may authenticate application program 244 to black box 240. As discussed in further detail below, one issue that arises in the use of a black box 240 that is separate from the application program 244 for which it provides services is that black box 240 should not perform sensitive functions for application program 244 unless it is certain that application program 244 can be trusted to use the sensitive functions only in approved ways, which means in practice that application program 244 must satisfy the protocol and other requirements necessary to proffer a trust certificate to black box 240. When decoupling interface 220 is used, application program 244 need only be able to communicate with decoupling interface 220, where various embodiments of decoupling interface can be provided each of which can authenticate application program 244 (and decoupling interface 220 itself) to a particular black box 240. Decoupling interface 220 may, for example, be provided by the supplier of black box 240 to facilitate communication between black box 240 and application program 244, as well as to facilitate the "renewability" of black box 240 (as more particularly discussed below). It will be appreciated by those skill in the art, however, that while decoupling interface 220 is a convenient and advantageous structure, communications between black box 240 and application program 244 may take place either directly or through decoupling interface 220 without departing from aspects of the invention.

Provision/Acquisition of Black Box 240

Figure 3:
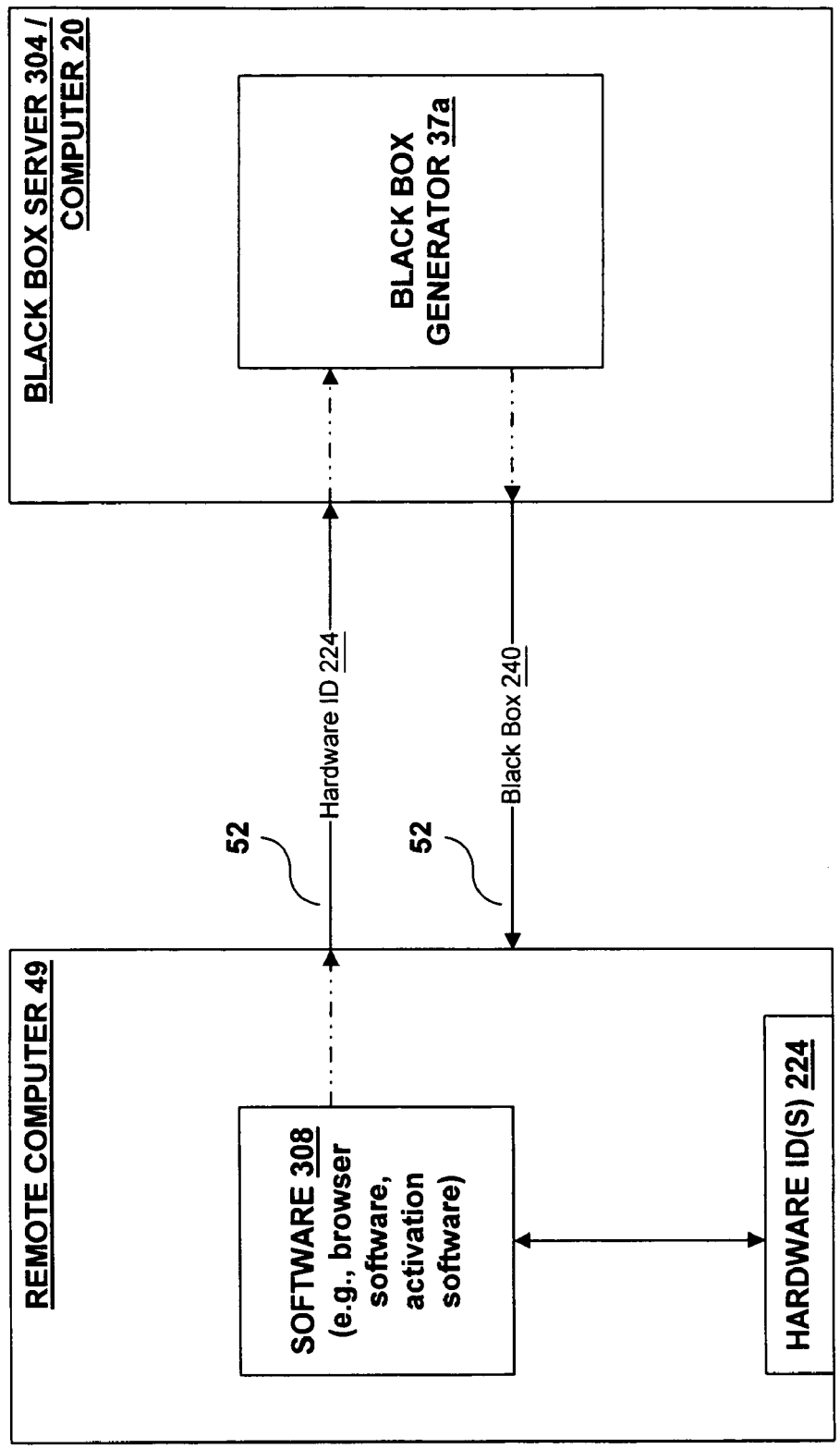
FIG. 3 is a block diagram showing a relationship between a computer that requests a secure repository and a computer that generates a secure repository.

Remote computer 49 acquires black box 240 from a black box server 304. Black box server 304 may be implemented on a typical computing device, such as computer 20 (shown in FIG. 1). (Hereinafter, black box server 304 and the computer 20 on which it is implemented shall be referred to interchangeably, unless context indicates otherwise.) Referring now to FIG. 3, black box server 304 is preferably connected to remote computer 49 via wide-area network 52. Preferably, wide-area network 52 is or comprises the network known as the Internet. Black box server 304 includes a black box generator 37a. Black box generator 37a is preferably a computer program running on computer 20 (such as one of the "other programs" 37 depicted in FIG. 1). Black box generator 37a receives a hardware ID 224 of a remote computer 49, and generates a black box 240 that is "individualized" for remote computer 49. "Individualized" in this context means that the contents of a given black box 240 is at least partly based on the hardware ID associated with the remote computer 49 for which the black box is created, and that a first black box 240 created for a first remote computer 49 is different from (or, at least, is very likely to be different from) a second black box 240 for a second remote computer 49. The various black boxes 240 are "different" in the sense that they contain different cryptographic keys 248, different code to apply the keys 248, and different obfuscating code. The particular ways in which the black boxes 240 can be made different are discussed more particularly below in connection with FIG. 4.

In a typical use of black box server 304, remote computer 49 contacts black box server 304 and transmits to black box server 304 a request for a black box 240 via wide-area network 52. The request for a black box may be generated as part of a registration or "activation" process relating to a particular type of software. For example, application program 244 may be delivered without a black box 240 that is needed for its use or some aspect thereof. For example, application program 244 may be able to work with unencrypted information (or even "keyless sealed" information) in the absence of black box 240, but may need black box 240 in order to be "activated" for use with encrypted information 204. In this case, application program 244 may include activation software 308 which is invoked upon the first use of application program 244, where activation software 308 contacts black box server 304 in order to obtain a black box 240 which will enable use of application program 244. As another example, software 308 may be general-purpose web-browsing software by means of which a user of remote computer 49 may issue a request to black box server 304 by navigating to a site operated by black box server 304.

The request for a black box 240 that comes from remote computer 49 preferably includes the hardware ID(s) 224 of remote computer 49. Upon receiving the request, black box server 304 invokes black box generator 37a and proceeds to create a black box 240 that is at least partly based on hardware ID(s) 224, and is thus "individualized" for remote computer 49. As discussed above, the black box 240 that is created will have one or more cryptographic keys 248 associated therewith and hidden therein. Once black box 240 has been created, black box server 304 transmits black box 240 via wide-area network 52 to remote computer 49 for installation thereon.

It is particular advantageous to transmit hardware ID 224 and black box 240 via a network such as wide-area network 52 or (if applicable) local area network 51, because this allows a black box 240 to be obtained in "real-time" (e.g., the entire transaction of requesting, creating, and receiving a black box may take only seconds). However, it will be appreciated that the use of a network is merely exemplary and not limited of the means by which information can be exchanged between remote computer 49 and black box server 304. For example, if hardware ID 224 is deemed to be sensitive information such that there is no network 51 or 52 over which it can be transmitted with sufficient privacy, then remote computer 49 may store its hardware ID(s) 224 on magnetic disk 29 or optical disk 31 for physical delivery to black box server 304, or hardware ID 224 may be printed on paper and then physically delivered to the operator of black box server 304 for entry using keyboard 40. Moreover, the black box 240 created by black box server 304 may be delivered on magnetic disk 29 or optical disk 31 for installation on remote computer 49; or it may be delivered via wide-area network 51 even if hardware ID 224 was not delivered to black box server 304 in that way.

Black Box Generator 37a

Figure 4:
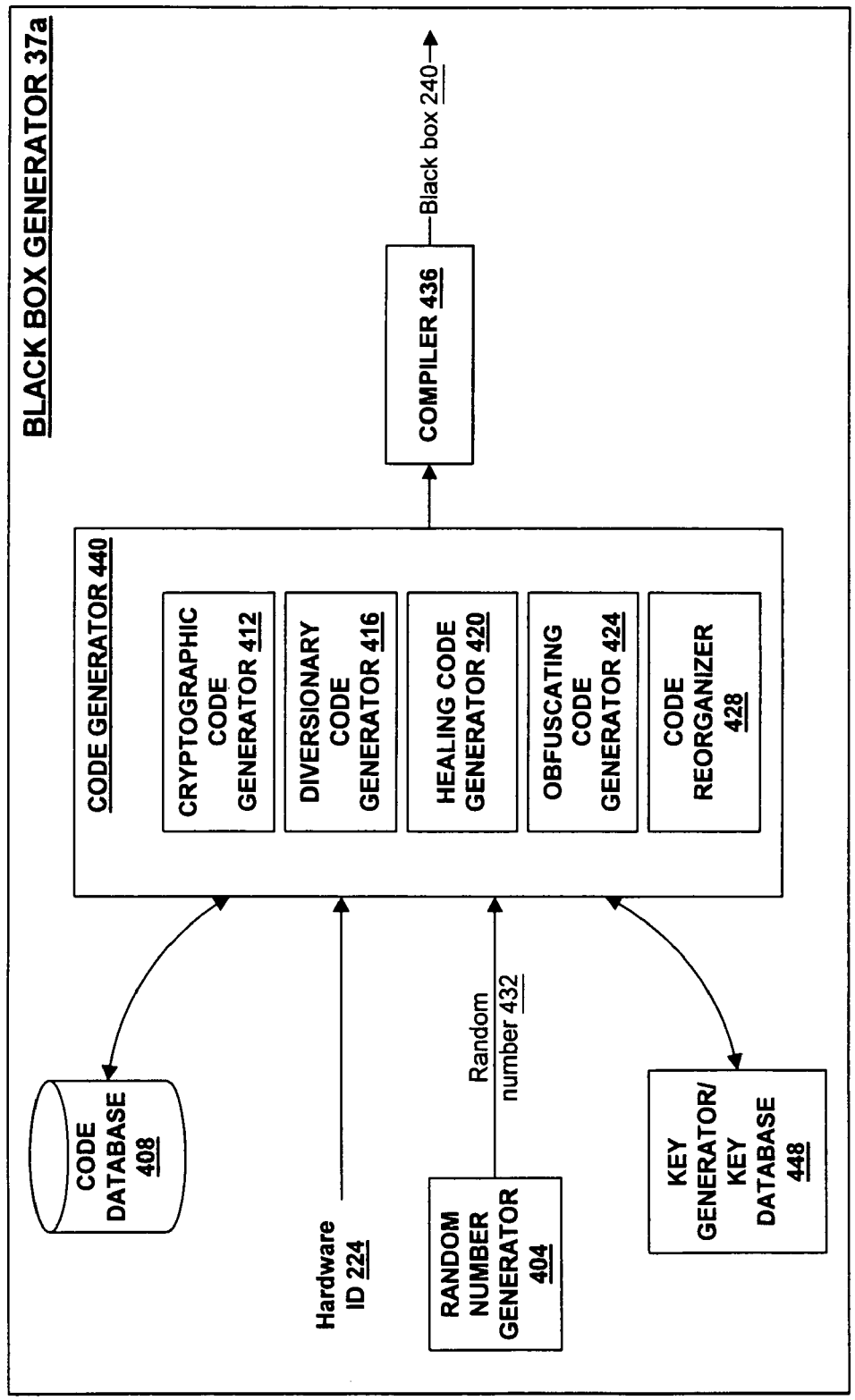
FIG. 4 is a block diagram of an exemplary secure repository generator according to aspects of the invention.

FIG. 4 shows the detail of black box generator 37a. Black box generator 37a comprises a random number generator 404, a code database 408, a key generator/key database 448, a code generator 440, a compiler 436, and a postprocessor 452. Random number generator 404 generates random (or pseudo-random) numbers 432, which are used in the black box generation process as described below. Systems and methods for generating pseudo-random numbers are known in the art and are therefore not described herein. Code database 408 contains "diversionary code" for use by diversionary code generator 416. Code database 408 may also contain templates for use by cryptographic code generator 412. The nature and use of the code contained in code database 408 is further described below. Key generator/key database 448 is an object that either generates cryptographic keys 248 to be installed in black box 240, or that stores previously-generated cryptographic keys 248 for installation in black box 240. Methods of generating cryptographic keys are known in the art, and thus are not provided herein. Moreover, methods of implementing a database such as code database 408 or key database 448 are also known in the art and thus are not provided herein. Code generator, as more particularly discussed below, generates the code that implements the individualized black box 240. Code generator 440 may produce code in a source language (such as C or C++), in which case compiler 436 is used to compile the code. If code generator 440 generates executable code directly, then compiler 436 may be omitted. Postprocessor 452, as more particularly discussed below, perfects certain code-obfuscation techniques that are specified at the source level by code generator 440 but cannot actually be performed and/or implemented until executable code has been produced.

Code generator 440 generates the code for black box 240. Recalling that black box 240 is "individualized" for remote computer 49, code generator 440 accepts as input the hardware ID 224, which is received by black box server 304 at the time that remote computer 49 requests an individualized black box 240. Code generator 440 generates the code for the black box based on hardware ID 224—that is, the code that code generator 440 includes in black box 240 is at least partly determined by hardware ID 224, such that, all other things being equal, different hardware IDs 224 cause code generator 440 to produce different code. Code generator 440 may also accept as input one or more random numbers 432, and the code produced by code generator 440 may be based on random number(s) 432 in the sense that different random number(s) cause code generator 440 to produce different code. Preferably, code generator 440 accepts as input both hardware ID(s) 224 and random number(s) 432, and produces code based both on such hardware ID(s) 224 and such random number(s) 432. However, it will be appreciated that code generator 440 could use one but not the other, or could use some other value as input. It is particularly advantageous, however, for code generator 440 to use both hardware ID(s) 224 and random number(s) 432, because this has the effect of: (a) producing a black box 240 with code that is at least partly "random"; and (b) allowing code to be included in black box 240 that binds black box 240 to hardware ID(s) 224. The "randomness" aspect of the code in black box 240 is advantageous because it helps to ensure that if a first black box 240 is successfully "hacked," the techniques used to "hack" the first black box 240 are not easily reused on a second black box 240 that has been generated with a different random number 432. The aspect of the code for black box 240 being bound to hardware ID(s) 224 is advantageous because it tends to make black box 240 resistant to portability.

Code generator 440 contains various components that handle different aspects of the code generation process. The components preferably include: a cryptographic code generator 412, a diversionary code generator 416, a healing code generator 420, an obfuscating code generator 424, and a code reorganizer 428. In FIG. 4, these components are depicted as separate components of code generator 440. However, it will be appreciated by those skilled in the art that the implementation depicted is merely exemplary, as a single component could perform one or more of the various functions described. Moreover, code generator 440 could contain a subset of the components depicted, or additional components. Additionally, while separate code generation and/or code manipulation components are depicted, it should be appreciated that the code generated by these components need not be or remain separate; the generated code can be interleaved or combined in any manner. For example, cryptographic code generator 412 may create a first set of code, and diversionary code generator 416 may create a second set of code, where the first and second sets do not necessarily remain as separate contiguous blocks but may be woven together in any manner. These variations and other may be effected without departing from the spirit and scope of the invention.

The exemplary elements depicted in FIG. 4 are each discussed below.

Cryptographic Code Generator 412

Cryptographic code generator 412 generates the code for inclusion in black box 240 that applies cryptographic keys 248. It will be recalled that a function of the exemplary black box 240 generated by code generator 440 is to use cryptographic key(s) 248 to perform decryption and authentication services while hiding key(s) 248 from the operator of remote computer 49 on which black box 240 is to be installed. Code generator 440 obtains these cryptographic keys from key generator/key database 448 and creates code that hides them in black box. The keys 248 obtained from key generator/key database 448 may be any type or size of cryptographic keys for use with any type of cryptographic algorithm. Preferably, cryptographic keys 248 include asymmetric or "public/private" key pairs for use with public/private key encryption/decryption and authentication algorithms. One non-limiting and preferred example of a public/private key algorithm for encryption/decryption and/or authentication is the RSA algorithm described in U.S. Pat. No. 4,405,829 (Rivest, et al.), although it will be appreciated by those skilled in the art that other public/private key algorithms could be used. Keys 248 are "hidden" in black box 240 in the sense that they are never actually represented in numerical form in black box 240. Instead, black box 240 contains code that performs actions that are functionally equivalent to those that would be performed by the relevant cryptographic algorithm if keys 248 were available. Regarding key "hiding" techniques, see generally A. Shamir & N. van Someren, "Playing Hide and Seek with Keys."

An understanding of how cryptographic code generator 412 can generate code that applies keys 248 where the code does not have access to keys 248 begins with the mathematical principle that some computations involving a given number can be performed without directly using the number, but merely by using certain properties of the number. For example, one can determine whether a decimal integer is even or odd without knowing its entire value, but merely by knowing its least significant digit: a decimal integer is even if and only if its least significant digit is 0, 2, 4, 6, or 8 (or, in the case of a binary integer, if and only if its least significant bit is 0). One can determine whether a number is negative or non-negative without examining the entire number, but merely by examining the sign of the number. The number's least significant digit (or bit) and its sign are "properties" of a number, which, in the foregoing examples, may be all that one needs to know about the number in order to compute the information desired. Thus, a program might receive a secret number as input, where the program performs a first action if the number is negative and a second action if the number is non-negative. In this example, the program could be constructed to store only the sign bit of the number. Alternatively, instead of storing any information about the number, the program could read the sign bit and then represent it in memory by dynamically creating code that (non-obviously) produces either 0 or 1 depending on what the sign bit is, where any portion of the program that needs to know the sign bit simply executes the dynamically-created code instead of retrieving the sign bit from memory. This is a simple example of how a program can be constructed to use a number without storing the number in memory or otherwise exposing the number to discovery by a user.

Analogously, cryptographic code generator 412 of the present invention makes use of mathematical properties of a particular cryptographic key 248, and creates code that computes the decrypted message that results from applying key 248 to a given ciphertext message without actually using key 248 itself or otherwise requiring access to key 248. Cryptographic code generator 412 similarly creates code that uses key 248 to validate cryptographic signatures—again, without requiring access to key 248. An explanation of the mathematics used in generating code to apply key 248 without accessing a copy of key 248 is provided in Appendix A below. In addition to the technique discussed in Appendix A, an additional key-hiding technique that may be used is to embed a random number in the code for black box 240, and to use that random number together with hardware ID 224 as a seed for a pseudo-random number generator; as the pseudo-random number generator produces numbers, bytes of a particular key may be plucked out of the number stream as needed by the cryptographic calculation.

Figure 5:
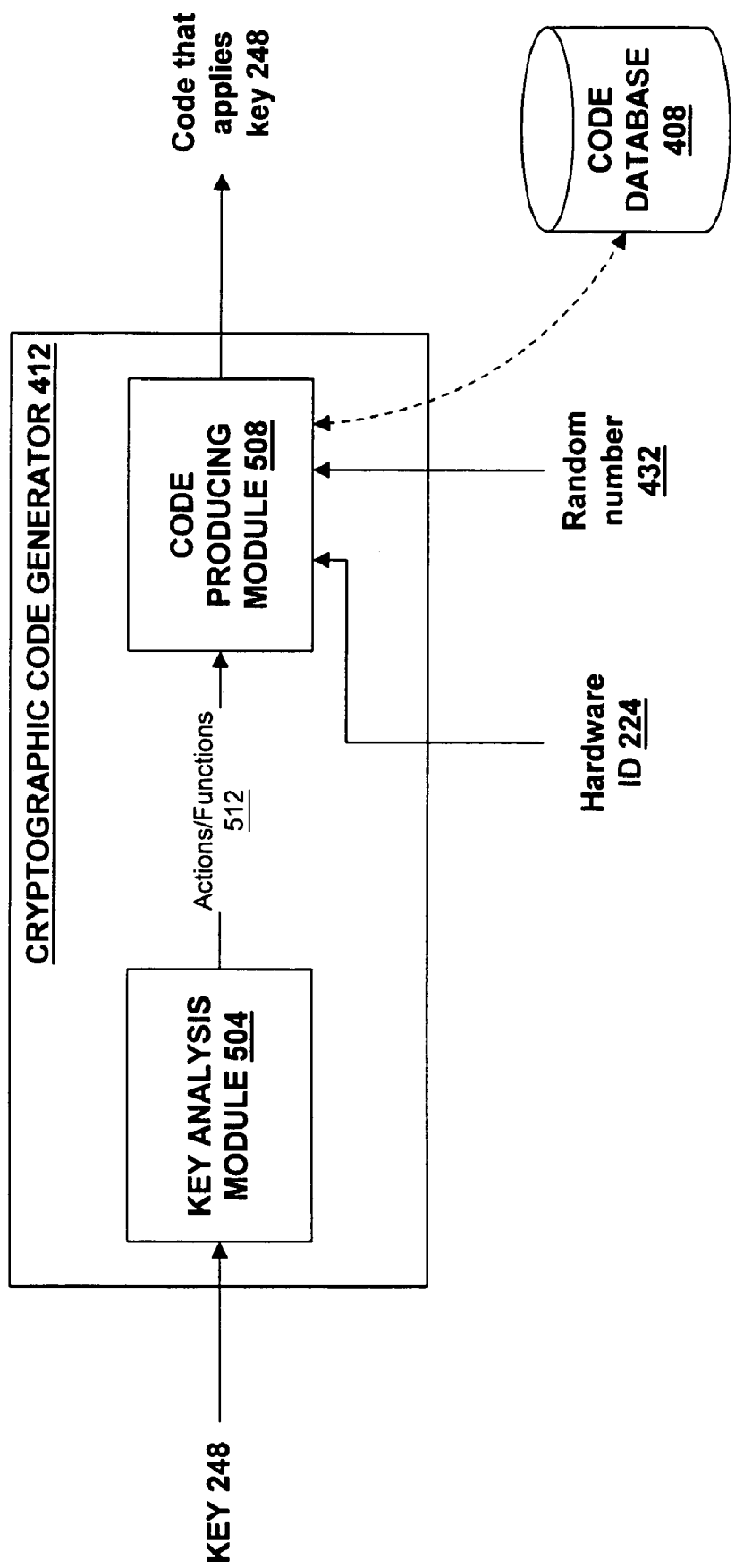
FIG. 5 is a block diagram of a cryptographic code generator according to aspects of the invention.

FIG. 5 shows the detail of an exemplary cryptographic code generator 412. Cryptographic code generator includes a key analysis module 504 and a code producing module 508 that produces the actual code that applies key 248. The key 248 obtained from key generator/key database 448 is received by cryptographic code generator 412 for analysis by key analysis module 504. Key analysis module 504 performs an analysis of key 248 in light of both its numerical properties and the cryptographic algorithm that will be used to apply it to a ciphertext message (or, in the case of authentication, to apply it to a digital signature). Key analysis module may identifies one or more properties or "attributes" of key 248 and produces or identifies one or more actions and/or functions 512 that would be performed by a cryptographic algorithm in the course of applying a key 248 having the identified attributes. For example, suppose that key analysis module 504 determines that the forty-second bit in the binary representation of key 248 is a one (i.e., "on"), and key analysis module 504 is programmed with information that a particular action/function 512 is always performed by a particular cryptographic algorithm whenever that algorithm applies a key whose forty-second bit is a one. This action/function 512 can be identified by key analysis module 504 and provided as input to code producing module 508. Key analysis module 508 may identify any number of attributes of key 248, and may provide all of the actions/functions 512 corresponding to these attributes to code producing module 508.

Code producing module 508 receives the actions/functions 512 that it will need to perform in order to apply key 248. It will be appreciated by those skilled in the art that it is possible to write a large—possibly infinite—variety of code that performs a given action or function 512. It will moreover be appreciated by those skilled in the art that, given a particular action or function 512, it is possible to generate different code to perform that function where the particular code generated is based on factors other than the action or function itself. In the example shown in FIG. 5, these "other factors" include hardware ID 224 and/or random number 432. Specifically, for each action or function 512, code producing module 508 produces code that performs such action or function 512, where the particular code produced is based on hardware ID 224 and/or random number 432.

Code producing module 508 can produced code based on hardware ID 224 and/or random number 432 in two ways. First, code database 408 may contain a plurality of alternative programs that perform the same action or function 512. For example, code database 408 may contain five different programs that perform a certain aspect of exponentiation, with each of the programs having been written by a human being and stored in code database 408. In this case, code producing module 508 may select a particular one of these five different programs based on the value of hardware ID 224 and/or random number 432. Second, code producing module 508 may generate code to perform an action or function 512 without the need to resort to a selection of human written code, but rather may write the code itself on an as-needed basis. Techniques for automated generation of code by machine are known in the art and therefore are not provided herein. Code producing module 508 may use automatic code generation techniques to generate code, where the particular code produced is based on hardware ID 224 and/or random number 432.

In addition to using hardware ID 224 as a parameter that merely determines the particular code used to perform certain actions or functions 512, code producing module may also produce code that specifically binds the produced code to a remote computer 49 having hardware ID 224. For example, certain critical values stored in the code could be increased by the value of hardware ID 224, and code could be created to retrieve hardware ID 224 directly from the hardware of remote computer 49 and subtract the retrieved hardware ID 224 from those stored values, where the critical value itself is the result of the subtraction. In this event, the code produced will not work (or will behave unexpectedly) unless the machine on which it is running provides access to the correct hardware ID 224. There are a multitude of possibilities as to how code may be built to rely on hardware ID 224 or otherwise to bind the code to hardware ID 224, and any of those possibilities may be used without departing from the spirit and scope of the invention.

Diversionary Code Generator 416

Returning now to FIG. 4, code generator 440 includes a diversionary code generator 416. Diversionary code generator 416 adds to black box 240 "diversionary code." The code produced by diversionary code generator 416 is "diversionary" in the sense that it performs computations—possibly an enormous quantity of computations—which preferably achieve no result of any importance to black box 240's function(s) of applying cryptographic keys 248 to encrypted information 204 or authenticatable data 212. While execution of the code produced by diversionary code generator 416 may produce no meaningful result, the code itself serves a purpose: it serves to confound attempts by hackers to analyze the code of black box 240. If one (e.g., a "hacker") begins with no knowledge of how black box 240 will perform its function, it is difficult or impossible to look at a particular piece of the code of black box 240 and determine whether it is the part of the code that performs sensitive functions, or merely the red herring produced by diversionary code generator 412. The code produced by diversionary code generator 412 may appear to be producing intermediate results used in the course of performing sensitive functions, where those results may never actually be used in the cryptographic process. Thus, one who is attempting to analyze the code of black box 240 will have to wade through (possibly) enormous amounts of code before finding the crucial part of the code that performs sensitive functions.

The code added to black box 240 by diversionary code generator 416 may be stored in code database 408. For example, code database may contain a gigabyte of computationally-intensive code, and diversionary code generator 416 may retrieve, for example, ten megabytes of this code for inclusion in black box 240. The particular ten megabytes of code retrieved may be based, for example, on hardware ID 224 and/or random number 432. The code stored in code database 408 for use by diversionary code generator 416 may, for example, be obtained from computationally-intensive programs that were written for purposes otherwise unrelated to black box 240. Although any code may be used, the code is preferably computationally-intensive, and preferably chosen to appear to a hacker as if it is doing something of importance to the cryptographic functions that black box 240 implements. For example, inasmuch as public/private key cryptographic algorithms rely heavily on exponentiation, code could be chosen from programs that perform mathematical computations involving large amounts of exponentiation. Alternatively, instead of using code stored in code database 408, diversionary code generator 416 could programmatically generate the diversionary code.

The code produced by diversionary code generator 412 may be included in black box 240 in a variety of ways. For example, the code that actually implements the cryptographic process could be scattered throughout the diversionary code. As another variation, instead of making the code that implements the cryptographic process completely non-dependent on the diversionary code, diversionary code could comprise computationally intensive code that always (but non-obviously) produces the number one and stores it in a register (although the code may appear to one unfamiliar with it as if it might be capable of producing some other value). The register could then be multiplied by a value used during the cryptographic process. This may have the beneficial effects of (a) making it appear to a hacker as if the diversionary code is actually performing some computation of use in the cryptographic process, thereby making it difficult to distinguish the diversionary code from the "real" code, and (b) causing the black box 240 to produce unexpected results if the diversionary code is modified (e.g. if it is modified in such a way that it no longer produces the number one).

Healing Code Generator 420

Code generator 440 includes a healing code generator 420. Healing code generator 420 creates code that uses "error-correction" principles to detect "patches" (i.e., additions or modifications to the code of black box 240 that were not part of that code as originally constituted). Healing code generator 420 may also create code that can be used to "repair" those patches by dynamically "re-modifying" the code of black box 240 to restore it to its original configuration (or to some intermediate state that exists (or should exist) during the execution of the black box 240 program).

In a conventional context, error-correction principles are employed to correct errors brought about by noise during data transmission. Application of these error correction principles to executable code is based on the notion that executable code, like any other data, is merely a sequence of bits. Therefore, minor modifications to the code (or any other data) can be detected and corrected—whether the modifications are brought about innocently by random noise, or nefariously by deliberate attacks on the code (or data). In order to create healing code, healing code generator 420 may incorporate one or more error correcting codes into the code for black box 240 as part of the individualization process. These error correcting codes (ECCs) may include linear codes (such as Hamming codes), cyclic codes (such as BCH codes) and Reed Muller codes. The code generated by healing code generator 420 can detect tampering based on parity checks and on the error syndrome that is calculated based on code and data in black box 240. Based on the calculated error syndrome, the code generated by healing code generator 420 may either correct the modification to the code, or effectively destroy the executing code by effecting other changes to the code that will cause incorrect operation of the black box 240 program. The code generated by healing code generator 420 may be designed to detect/heal tampering both as to the initial state of the black box 240 program (i.e., the state of the black box 240 program immediately after loading it into memory) and/or the running state of the program (i.e., the state of the execution space of the program at some intermediate point during its execution). Additionally, as part of the individualization process, healing code generator 420 may create error correcting code based on a random number and/or hardware ID 224.

Obfuscating Code Generator 424

Code generator 440 includes an obfuscating code generator 424. Obfuscating code generator 424 creates code that complicates examination and modification of the functions performed by black box 240. It will be appreciated that code produced by other components of code generator 440 is already considerably resistant to analysis. As noted above, the code that applies key 248 resists discovery of the key due to the fact that the key is never stored. Additionally, the "diversionary" code makes it difficult to discover which code is performing the sensitive cryptographic functions. Obfuscating code generator 424 adds an additional layer of protection to black box 240.

Obfuscating code generator 424 complicates analysis and/or modification of black box 240 by such techniques as: encrypting portions of the code of black box 240; introducing "integrity checks" into black box 240; and/or obfuscating execution of code segments (e.g., by loading the code into scattered, randomly-located portions of memory for execution). Obfuscating code generator 424 selects portions of the code of black box 240 to be protected by encryption, integrity checks, and obfuscated execution. Preferably, the encrypted portions include the portions of the code that perform the most security-sensitive cryptographic functions performed by black box 240, but also include other portions in order to complicate the identification of the truly crucial portions of the code. (I.e., if only the most sensitive portions were encrypted, then it would be easy for a hacker to locate the most sensitive portions simply by looking for encrypted code; therefore, these portions can be hidden by encrypting unimportant portions of the code including, but not limited to, the diversionary code produced by diversionary code generator 416.) Additionally, obfuscating code generator 424 selects segments of the black box code to be preserved by integrity checks and obfuscated execution.

As noted above, the code generated by code generator 440 is preferably in a source language, such as C or C++. One method of introducing the above-mentioned security protection into code that is created in a source language is to use a software development tool such as a "secure coprocessor simulation" ("SCP") toolkit. The following is a brief description of an SCP system, which is an exemplary tool used by obfuscating code generator 424 to introduce protections into the code of black box 240.

SCP: Overview

The SCP system works at the source-code level by creating a number of classes called SCPs, each of which supports an API for security operations such as encryption, decryption, integrity verification, and obfuscated execution. Operations such as encryption and checksum computation handle relocatable words, so that the SCP system may work whether or not code is relocated (e.g., as with DLLs).

To protect an application with the SCP system, one must have access to the application source code. Although the entity with access to the source code may be a human program, this need not be the case. Specifically, an automatic code generator, such as the code generator 440 used to create black box 240, may also use the SCP system to insert protections into code. The entity (i.e., human programmer or code generator) performs the following steps to use the SCP system to protect code:

1. SCP macros and labels are inserted into the source file(s) to be protected. These macros and labels indicate code sections to be protected by such measures as encryption, integrity verification, and obfuscated execution.
2. Places in the source code are selected where functions such as obfuscated execution, integrity verification, decryption, and other SCP functions are to be performed. SCP macros and calls are inserted into the source code at these selected placed to perform these actions.
3. SCP files are added to the application and/or compiled with the application source code to yield an application executable (e.g., a .EXE or .DLL file).
4. A post-processing tool (e.g., postprocessor 452) is run on the application executable file. The post-processing tool may locate sections of the executable file to encrypt, checksum, or otherwise process in the executable. The post-processing tool may also randomly (or pseudo-randomly) generate cryptographic keys, encrypt the code, scatter some keys throughout the executable file's code (i.e., ".text") section, and perform other setup actions.

The follow sections describe exemplary features of the SCP system.

SCP: Code-Integrity Verification

A programmer (or code generator 440) may checksum any number of (possibly overlapping) application segments at any time during execution. SCP provides two verification methods, which are accessed via a macro-based API that generates appropriate functions and data in the protected application's code (.text) section. The SCP system may, for example, assume that only one code section exists and that its name is ".text," as is typically the case with standard WIN32 executables. Verification checks can be inlined (as described below) to avoid exposing boolean return values and single points of attack.

Method 1: This method works with overlapping segments. The programmer or code generator marks a region to be verified by inserting the macros:
 BEGIN_VERIFIED_SEGMENT(ID1, ID2)
and
 END_VERIFIED_SEGMENT(ID1, ID2)

inside functions, and adding the macro
 VERIFIED_SEGMENT_REF(ID1, ID2)

outside of functions. The former two macros mark regions, and the latter macro creates a "segment-reference function" that returns the region's addresses and checksum. The variable (ID1, ID2) is a unique two-byte segment identifier, and checksums are pre-computed in order of the ID1 values of regions; this is to allow cross-verification of code regions by ensuring a definite order of checksum computation and storage in the code section. To verify a region, the programmer or code generator inserts a function such as
 SCP.VerifySeg(VerifiedSegmentRefID1_ID2), which returns a boolean value and makes available both the valid checksum and the computed checksum (which must match if the code segment is intact). Any SCP object can verify any segment.

Method 2: The second method works only with non-overlapping segments. The programmer or code generator specifies a section to be verified using the macros
 BEGIN_VERIFIED_SECTION(Section, ID1, ID2)
and
 END_VERIFIED_SECTION(Section, ID1, ID2)

which must be placed outside of functions. The variables (Section, ID1, ID2) specify a unique section name and a pair of identifier bytes. The programmer or generator can verify a section by inserting into the source code a function call such as
 SCP.VerifyAppSection(BeginSectionID1_ID2, EndSectionID1_ID2)

both to obtain a boolean verification value and two checksums, as above.

It should be noted that integrity checks can be performed in a way that is dependent on hardware ID 224, such that black box 240 will not operate properly if it is running on the wrong machine.

SCP: Secret Scattering

Method 2 above uses cryptographic keys scattered using a subset-sum technique. Each key corresponds to a short string used to compute indices into a pseudo-random array of bytes in the code section, retrieve the bytes specified by the indices, and combine these bytes into the actual key.

SCP: Obfuscated Function Execution

Using labels and macros, the programmer or code generator may subdivide a function into any number of blocks that the SCP system encrypts. When the function runs, SCP preferably uses multiple threads to decrypt each block into a random memory area while executing another block concurrently. Code run in this manner is preferably self-relocatable. For example, one way to implement self-relocatable code on the Intel x86 platform is to make all function calls via function pointers. Alternatively, code could be relocatable by means of dynamically adjusting call offsets during execution.

SCP: Code Encryption and Decryption

The programmer or code generator can specify any number of code regions to be encrypted by enclosing them within the macros
 BEGIN ENCRYPTED_SEGMENT(ID1, ID2)
and
 END_ENCRYPTED_SEGMENT(ID1, ID2)

and adding the macro
 ENCRYPTED_SEGMENT_REF(ID1, ID2)

outside encrypted regions. These macros and the previously described macros for verified segments serve similar purposes. If a verified region with the identifier (ID1, ID2) exists, its checksum is used as the encryption key for the corresponding encrypted segment (i.e., the one with identifier (ID1, ID2)). The programmer or code generator calls for a segment to be decrypted prior to its execution (by inserting appropriate SCP call(s)), and can then re-encrypt the segment (also using appropriate SCP call(s)). Encrypted segments may overlap, and may preferably be encrypted based on their order of appearance in the source code.

SCP: Probabilistic Checking

Each SCP class has its own pseudo-random-number generator that can be used to perform security actions such as integrity verification only with certain probabilities. Additionally, SCP macros may be available that produce pseudo-random generators inline for this function, as well as for any other function that requires pseudo-random numbers.

SCP: Boolean-Check Obfuscation

Several SCP macros provide means of hiding boolean verification of checksums. In particular, SCP macros or objects may use checksums to mangle stack and data, and compute jump addresses and indices into simple jump tables, so that boolean checks become implicit and non-obvious.

SCP: Inlining

To avoid single points of attack, SCP provides macros for inline integrity checks and pseudo-random generators. These macros may essentially duplicate the code from the SCP segment-verification functions.

Code Reorganizer 428

Code generator 440 may include a code reorganizer 428. Code reorganizer 428 reorders or resequences the code that has been produced by the other components of code generator 440. For example, code reorganizer 428 may move instructions in the code into a different sequential order, and then add jumps (such as "conditional" jumps that test for a condition that is always, but non-obviously, true.

Other Features of Code Generator 440

Code generator 440 has some features that cut across the exemplary components depicted in FIG. 4. For example, code generator 440 may create different code to perform the same function within black box 240. This technique has the effect of obfuscating the function being performed, since one must perform an analysis of the different code segments in order to determine whether they are functionally equivalent. Additionally, the differing code segments may be "inlined," so as to guard against single point attacks. Other techniques that may be used by code generator 440 including introducing timing loops (to detect "hijacking" of calls by an outside program), or "interleaving" data, state and code by hashing and jumping on the result (which may have the effect of making local modification more difficult). Code generator 440 may create code that implements techniques aimed at detecting observation of black box 240 by a kernel-level debugger; such techniques may include changing debug registers, checking to see if debug registers were changed, trapping randomly and examining stack addresses. Moreover, code generator 440 may create non-sensitive code for black box 240, such as routine code that performs the startup and shutdown of black box 240, or that performs routine "housekeeping" tasks (although this "routine" code may still be protected by techniques such as those introduced by obfuscating code generator 424).

Code generator 440 may also produce "diversionary data" for inclusion in black box 240. Like the "diversionary code" discussed above, diversionary data is not of direct relevance to the functions that black box 240 performs, but serves to complicate analysis of black box 240. Diversionary data may include data that is never used, data that is used exclusively by diversionary code, or as input to functions which are designed to nullify the effect of the diversionary data. An additional feature of the diversionary data is that, since its quantity can be varied, it has the effect of shifting the address of black box 240's useful code between different instances of black box 240, which makes it less likely that a successful attack on one black box will aid an attack on another black box.

Compiler 436

Compiler 436 is used when code generator 440 creates code in a source language instead of machine-executable code. For example, in an exemplary embodiment code generator 440 creates code in the C++ programming language, and compiler 436 is or comprises a C++ compiler. Compiler 436 receives the source code produced by code generator 440 and converts it into executable code. Compilers are well-known in the art and commercially available, and therefore are not discussed in detail herein. Compiler 436 may be a specially-configured compiler included in black box generator 37a, or it may be a general purpose compiler that is separate from black box generator 37a.

Postprocessor 452

The SCP tool discussed above provides a convenient means to specify certain code security techniques, such as inline code encryption, integrity verification (e.g., checksums), and obfuscated execution of code. However, certain aspects of these techniques cannot be performed directly on source code. For example, it is not possible to encrypt source code prior to compilation. Instead, portions of the executable code to be encrypted can be delimited in the source file, but the actual encryption must await creation of the executable code. Similarly, segments to be protected by integrity checks can be delimited in the source, but the actual creation of the integrity value must await creation of the executable, since it is not possible to obtain a hash of the executable code (by means of which integrity will be verified) until the source code has been compiled. Postprocessor 452 performs these functions.

Postprocessor 452 performs, for example, the functions of: encrypting the code specified for encryption, computing integrity value, generating cryptographic keys for the encryption of code, and storing integrity values and code decryption keys in the executable file.

Process of Creating an Individualized Black Box

Figure 6:
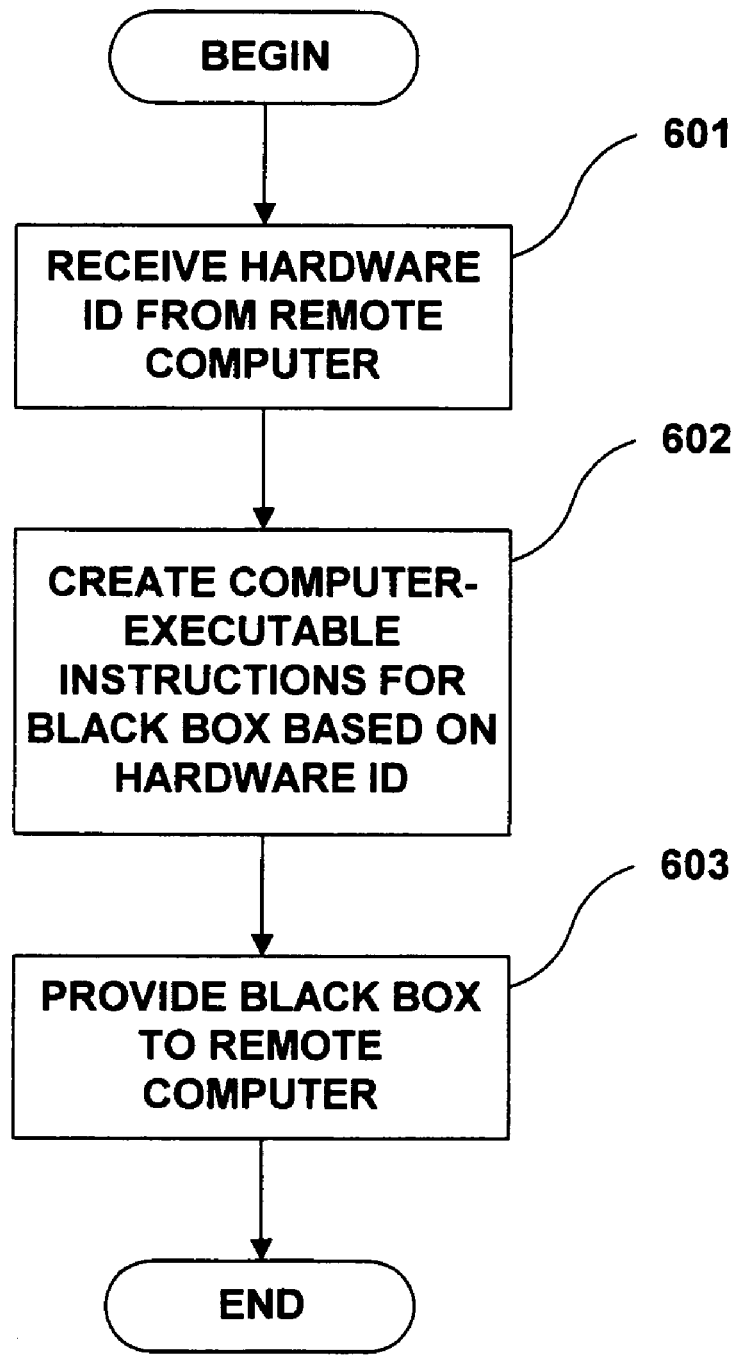
FIG. 6 is a flow diagram showing an exemplary process for creating a machine-individualized secure repository.

Referring now to FIG. 6, an exemplary process is shown by way of which black box server 304 creates and provides a secure repository that is individualized for remote computer 49, such as exemplary black box 240. First, at step 601, black box server 304 receives the hardware ID 224 associated with remote computer 49. As previously noted, hardware ID 224 may be received via a network, such as wide-area network 52, in the form of a request for a black box 240, where the request comes from remote computer 49. Alternatively, hardware ID 224 may be received by other means, such as physical delivery on a digital medium (e.g., magnetic disk 29, optical disk 31, etc.), or on paper for entry by keyboard. Black box server 304 may use the process depicted in FIG. 6 to create an individualized black box regardless of how it receives hardware ID 224. Moreover, it will be appreciated by those skilled in the art that hardware ID 224 is merely exemplary of the type of information that supports the creation of a black box 240 individualized for remote computer 49. For example, instead of hardware ID 224, black box server 304 may receive the serial number of an operating system running on remote computer 49. Any type of information will suffice, provided that it identifies remote computer 49, or is in some way related to remote computer 49 or to the environment present on remote computer 49 (e.g., the serial number of the operating system installed on remote computer 49).

At step 602, black box server creates the executable code for an individualized black box 240, where the code created is at least partly based on hardware ID 224. As discussed above, the process of creating this executable code may, for example, be performed by black box generator 37a. An exemplary process by which step 602 performed is shown in FIG. 7 and discussed in detail below.

At step 603, black box server 304 provides the individualized black box 240 to remote computer 49. Black box server 304 may provide black box 240 via, for example, wide-area network 52, which may be the same network over which black box server 304 received hardware ID 224. Alternatively, black box server 304 may provide black box 240 to remote computer 49 by physical delivery of magnetic disk 29 or optical disk 31, or by any other means by which the executable file(s) in which black box 240 is contained may be communicated from one computer to another.

Figure 7:
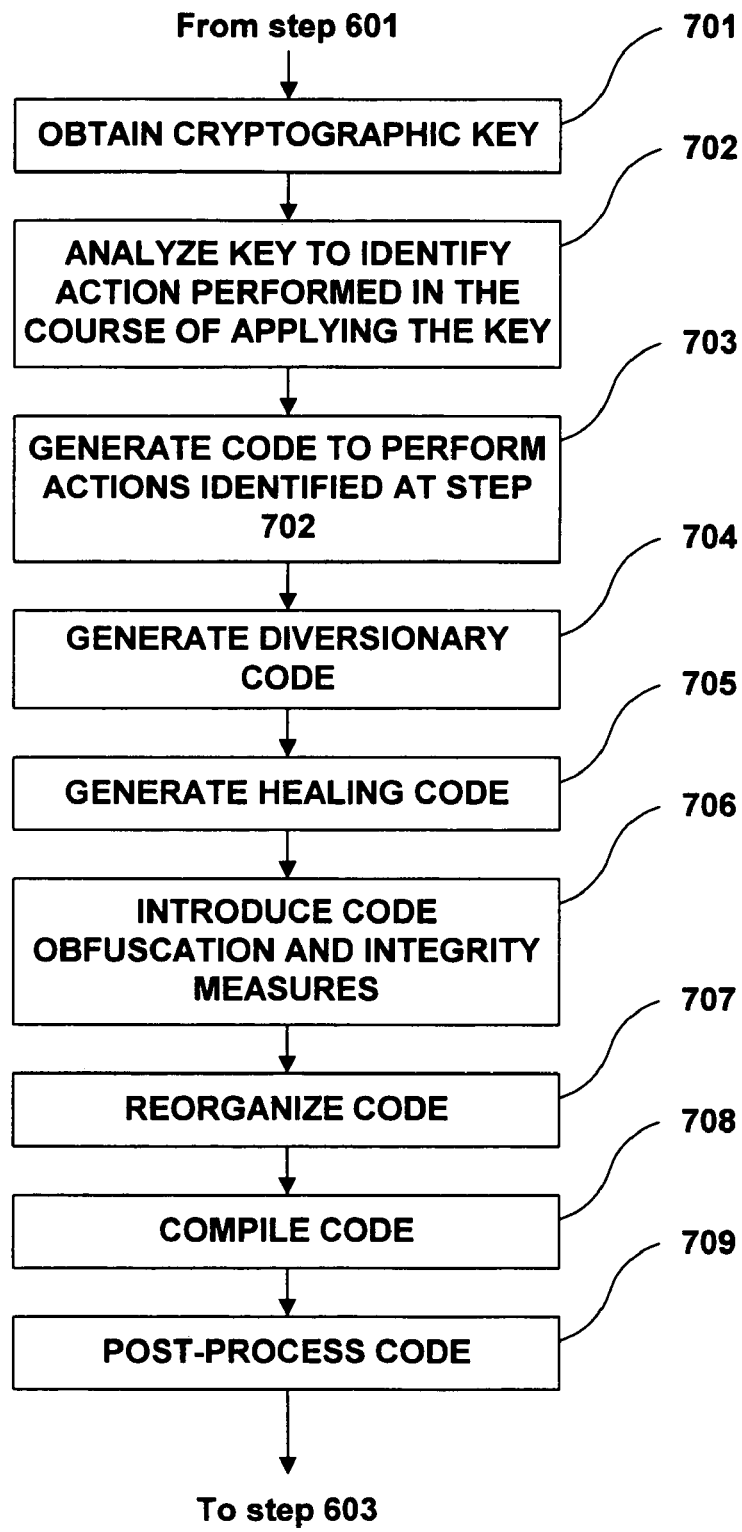
FIG. 7 is a flow diagram showing an exemplary process for performing the code creation step of FIG. 6.

FIG. 7 shows an exemplary process for performing the code creation step 602 depicted in FIG. 6. The process shown in FIG. 7 may, for example, be carried out by black box generator 37a (shown in FIG. 4). At step 701, black box generator 37a obtains a cryptographic key 248 (or possibly several cryptographic keys) to be hidden in black box 240. Cryptographic key 248 may, for example, be obtained from key generator/key database 448.

At step 702, black box generator 37a analyzes the newly obtained cryptographic key 248 in order to identify one or more actions that would be performed in the course of using a given cryptographic algorithm to apply cryptographic key 248 to data. The cryptographic algorithm may either be a decryption algorithm (that uses cryptographic key 248 to convert ciphertext into cleartext), or an authentication algorithm (that uses cryptographic key 248 to verify that a particular data was created by the holder of a particular secret). The particular cryptographic algorithm by which cryptographic key 248 will be applied is be taken into account when identifying actions will be performed in the course of applying cryptographic key 248. As one example, step 702 may include the act of using key analysis module 504 of cryptographic code generator 412 to identify actions/functions 512, as depicted in FIG. 5.

At step 703, black box generator 37a generates code to perform the actions identified at step 702. The code generated at step 703 is capable of applying cryptographic key 248 to data, preferably without requiring access to cryptographic key 248 itself. The process of generating code the code may, for example, be carried out by code producing module 508 of cryptographic code generator 412, depicted in FIG. 5. Code may be generated programmatically, or it may be retrieved from code database 408. The particular code that is generated or retrieved may be at least partly based on hardware ID 224 and/or random number 432. Additionally, the code produced may be designed to rely in some way upon correct dynamic retrieval of hardware ID 224 from the environment in which black box 240 is intended to run.

At step 704, black box generator 37a generates "diversionary" code for inclusion in black box 240. Diversionary code may, for example, be stored in code database 408. A portion of the code stored in code database 408 may then be retrieved by diversionary code generator 416. The particular code retrieved for inclusion in black box 240 may be based, for example, on random number 432 and/or hardware ID 224.

At step 705, black box generator 37a generates "healing" code, which is designed to replace "patches" (i.e., unauthorized modifications to the code of black box 240) with the originally intended code. The healing code may be generated, for example, by healing code generator 420. The particular code generated at step 705 is generally based on other parts of the code to be included in black box 240, since the code generated at step 705 is specifically designed to replace portions of black box 240 if they become modified.

At step 706, black box generator 37a introduces obfuscation and integrity measures into the code of black box 240, such as encrypted code, integrity checks, and obfuscated execution of code. Black box generator 37a may, for example, perform this function by using obfuscating code generator 424 to introduce the macros and function calls of the SCP system described above.

At step 707, black box generator 37a reorganizes the code for black box 240, for example by reordering or resequencing segments of the code and introducing jumps to cause the code to be executed in the correct sequence. The reorganization may, for example, by performed by code reorganizer 428.

At step 708, the code generated by black box generator 37a at steps 703 through 707 is optionally compiled. Preferably, the code generated at steps 703 through 707 would be generated in a source language such as C or C++, in which case it needs to be compiled. The compilation may, for example, be performed by compiler 436, which is a compiler appropriate for the language in which the code was generated, such as a C compiler or a C++ compiler. In an alternative embodiment in which black box generator 37a generates code directly in a machine executable format (e.g., a .EXE or .DLL file), then it is unnecessary to perform step 708.

At step 709, black box generator 37a performs postprocessing of the executable code for black box 240. Step 709 may, for example, be performed by postprocessor 452. As previously discussed in connection with FIG. 4, there are some aspects of the code obfuscation and integrity measures introduced at step 706 that cannot be perfected at the source level, but must wait until the executable code has been produced. For example, one obfuscation measure is to encrypt executable code inline, and decrypt it prior to its use. It is not possible to encrypt the executable code until it has been produced (and it is not possible to encrypt the source code because it will not compile). Moreover, it is not possible to create the integrity values (e.g., hashes, checksums, etc.) that are used to implement integrity checks because these measures, too, require encrypted code. Thus, at step 709 postprocessing of the executable code produced at step 708 is performed. Specifically, sections of code delimited for encryption are encrypted, and sections of code marked for integrity checks are hashed. The keys used for encrypted code may be selected at step 709. The keys may be based in part on hardware ID 224 and/or random number 432. The particular method of performing an integrity check may be based in part on hardware ID 432.

Once postprocessing is complete, black box generator 37a proceeds to step 603 shown in FIG. 6. It will be appreciated that, while the steps of FIG. 7 are depicted as taking place in a certain order, certain of the steps shown may take place in a different order. For example, the code generated at step 703 through 705 could be generated in sequences other than that depicted in FIG. 7. The reorganization of code at step 707 could take place either before or after the compilation performed at step 708. Other modification may be made to the order of steps without departing from the spirit and scope of the invention.

Example Architecture Incorporating Black Box 240 and Decoupling Interface 220

Figure 8:
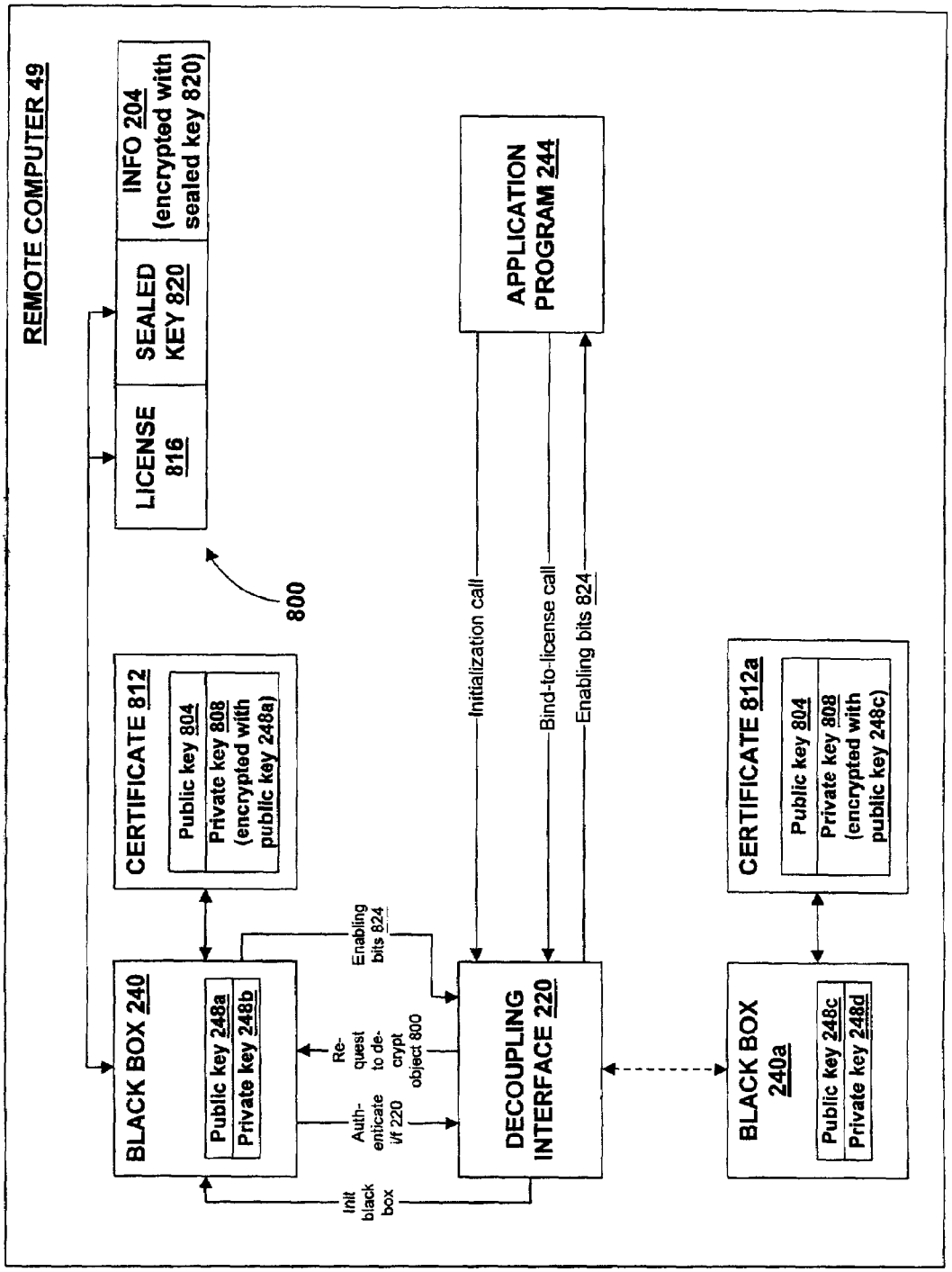
FIG. 8 is a block diagram showing an exemplary architecture that includes a decoupling interface for use with a secure repository and an application program.

As noted above in connection with FIG. 2, black box 240 and application program 244 may communicate either directly or through a decoupling interface 220. FIG. 8 shows an exemplary architecture of a system in which a decoupling interface is employed for use with black box 240 and application program 244.

Decoupling interface 220 addresses the issue of how black box 240 can be replaced with another black box 240*a*, while still permitting communication and authentication to take place between application program 244 on the one hand, and black box 240 or 240*a* on the other hand. Replacement of black box 240 may become necessary if black box 240 has become damaged (e.g., if a hacker has made a deliberate and irreparable attempt to modify black box 240), if black box 240 has become obsolete due to the development of new secure repository technology (which may, for example, include either new software techniques or a hardware-based repository), or if application program 244 may be usable on different types of platforms having different types of secure repositories. (E.g., an open platform such as a PC running one of the MICROSOFT WINDOWS 95, 98, NT, or 2000 operating systems may require a different type/level of security from a closed platform such as a dedicated text viewing device.) However, it will be noted that application 244 preferably should be able to interface with any black box—either original or replacement—in at least two ways. First, application program 244 needs to authenticate itself to the black box, since the black box should not perform sensitive function for an entity who has not established trustworthiness. Second, application program 244 needs to be able to communicate with black box 244 in order to request performance of the sensitive functions that black box 244 is designed to perform. Decoupling interface 220 provides a single authentication and communication protocol that application program 244 can use regardless of the black box being used, thus making the particular secure repository transparent to the developer of application program 244.

Application program 244 and black box 240 in the exemplary architecture shown communicate through decoupling interface 220. Decoupling interface 220 may, for example, be or comprise an application programmer interface (API) having an "initialization" call and a "bind to license" call. (Licenses are explained in further detail below; briefly, a license permits the use of content protected by black box 240.) The API may be provided in the form of a dynamic-link library (.DLL) file that is loaded with application program 244 and executes in the process (i.e., in the address space) of application program 244. Both of the calls provided by the API may be exposed to application program 244 and implemented by decoupling interface 220 (i.e., the calls have addresses located in the address space of application program 244). Additionally, these two calls may preferably provide all of the interaction that is necessary in order for application program 244 to make use of black box 240. For example, the "initialization" call may perform the functions of (a) authenticating application program 244 to black box 240, and (b) causing decoupling interface to execute instructions that initialize black box 240 for use and allow black box 240 to authenticate decoupling interface 220. A purpose of black box 240's authenticating decoupling interface 220 is to establish a chain of trust. Since decoupling interface 220 presents application program 244's proffer of trustworthiness to black box 240, black box 240 must trust decoupling interface 220 to perform this authentication properly (e.g., black box 240 may need to ensure that decoupling interface 220 is not a rogue DLL presenting a stolen certificate in an unauthorized context). The bind-to-license call may request that black box 240 perform its sensitive function(s) for application program 244. In the example depicted in FIG. 8, the sensitive function that black box 240 performs is to enable the use of encrypted licensed data object 800 when permitted by license 816 (as more particularly described below), and the bind-to-license call may provide "enabling bits" 824 that allow application program 244 to use licensed data object 800.

For example, application program 244 may issue an initialization call (e.g., DecouplingIF::Init( )) which is implemented by decoupling interface 220. This call may cause decoupling interface 220 to execute code that starts black box 240, gives it an opportunity to authenticate decoupling interface 220, and prepares a secure environment that discourages modification or observation of black box 240 while black box 240 is executing. It should be noted that the act of authenticating decoupling interface 220 is optional, as there may be environments in which the authenticity of decoupling interface 220 can be presumed from circumstance (such as purpose-built devices for which all software is in the form of "firmware" installed by the manufacturer). Black box 240 may take steps to prepare a secure environment, such as attaching to application program 244 using the DebugActiveProcess system call of the MICROSOFT WINDOWS 95/98/NT/2000 operating systems, in order to prevent other debuggers from attaching. Preferably, decoupling interface 220 does not process the bind-to-license call until decoupling interface 220 has completed the initialization process with black box 240. After the initialization process is complete, application program 244 may issue a bind-to-license call (e.g., DecouplingIF::BindToLicense( )), which causes decoupling interface 220 to execute code that requests black box 240 to perform its sensitive functions for application program 244. In the example of FIG. 8, the bind-to-license call requests that black box provide enabling bits 824. Black box 240 then provides enabling bits 824 to decoupling interface 220 (assuming that circumstance permit), and decoupling interface 220 provides enabling bits 824 to application program 244. It will be appreciated that this arrangement allows application program 244 to authenticate itself and request services from black box 240 without knowing the details, mechanics, or communications protocols needed to interface directly with black box 240. In effect, decoupling interface provides a common language through which application program 244 and black box 240 may communicate.

Still referring to FIG. 8, in the exemplary architecture shown, data object 800 is a file that includes encrypted information 204, a sealed key 820, and a license 816. Sealed key 820 may be the key that decrypts encrypted information 204. In a preferred embodiment, sealed key 820 is a symmetric key that was used to encrypt encrypted information 204. License 816 governs the use of encrypted information 204. For example, license 816 may specify the rights to decrypt and/or render encrypted information 204. Encrypted information 204 may, for example, be the text of a book. In other examples, encrypted information 204 may be audio or video content, such as a digital audio file or a digital video file. Application program 244 is a software application appropriate for the nature of the information contained in data object 800. For example, if encrypted information 204 is the text of a book, then application program 244 may be a text-rendering application or "reader" program. If encrypted information 204 is a digital audio or digital video, then application program 244 may be an audio-rendering or video-rendering application.

The exemplary architecture of FIG. 8 includes black box 240. Black box 240 includes a public key 248*a*, and a corresponding private key 248*b*. As discussed above, private key 248*b* is preferably "hidden" in black box 240, such that no copy of private key 248*b* actually appears in black box 240, although black box 240 contains the code necessary to apply private key 248*b*.

In the example of FIG. 8, there is shown a certificate 812, which has associated therewith an asymmetric key pair including a public key 804 and a private key 808. Private key 808 is not represented directly in certificate 812, but rather is encrypted with the public key of black box 240. Sealed key 820 is "key"-sealed in data object 800 with public key 804 of certificate 812 such that it can only be "unsealed" with private key 808. It will be appreciated that the series of encrypted and sealed keys establishes a chain of control from black box 240, to certificate 812, to sealed key 820, to encrypted information 204, such that it is not possible to decrypt information 204 without all of these objects. Specifically, information 204 can only be accessed with sealed key 820. Sealed key 820, in turn, can only be accessed with private key 808. Private key 808, in turn, can only be accessed with private key 248*a* of black box 240. This is a particularly advantageous arrangement, since it allows access to data object 800 to be tied to the private key 808 of certificate 812, rather than to a particular black box 240. For example, if black box 240 were replaced with black box 240*a* (which has public/private keys 248*c* and 248*d*, which are different from public/private keys 248*a* and 248*b* of black box 240), data object 800 could be used by black box 240*a* without any modification to data object 800, merely by issuing a new certificate 812*a*, which has the same public/private keys 804 and 808, but with private key 808 being encrypted with public key 248*c* of new black box 240*a*, instead of being encrypted with public key 248*a* of old black box 240.

Exemplary black box 240 depicted in FIG. 8 performs the function of enabling application program 244 to render encrypted content 204 by providing "enabling bits" 824 to application program 244. Enabling bits 824 may comprise either decrypted content 208 (in which case black box 240 performs the function of applying key 820 to convert encrypted content 204 into decrypted content 208), or key 820 itself (in which case application program 244 uses key 820 to perform the actual decryption of data object 800). Exemplary black box 240 also perform the function of validating license 816 to determine whether license 816 permits use of encrypted information 240. If license 816 does not permit the use of encrypted information 804 (e.g., if license 816 is expired, or if data object 800 is not present in an authorized environment), then black box 240 does not provide enabling bits 824 to application program 244.

Black box 240 preferably provides enabling bits to application program 244 by way of decoupling interface 220. However, application program 244 and black box 240 may communicate directly in accordance with aspects of the invention. Decoupling interface is particularly useful in the example of FIG. 8, because it allows for simple replacement of black box 240 with black box 240*a* without requiring any modification to rendering application 244. Thus, in accordance with aspects of the invention, black box 240 could be replaced with black box 240*a* (e.g., if black box 240 has become corrupted or obsolete) without any change to either rendering application 244 or data object 800—merely by providing black box 240*a* with certificate 812*a* and, if necessary, replacing the code of decoupling interface 220 to allow it to communicate/authenticate with black box 240*a*. (E.g., If decoupling interface 220 is a dynamically linkable library of executable code (i.e., a DLL) which links to application program 244 at runtime, the DLL can be replaced with a new DLL. This replacement may transparent to application program 244, since the calls made by application program 244 (i.e., Init( ) and BindToLicense( )) would simply reference the new code in the new DLL.) Thus, the use of decoupling interface 220 is particularly advantageous because it supports the replaceability of black box 240, and thus supports a "renewable" model of security. For example, if a hardware-based repository should become available, decoupling interface 220 may provide communication between the not-yet-created hardware based repository and application program 244 in a manner that is transparent to the developer of application program 244. As another example, technology for the creation of software-based repositories could progress, thereby allowing a first software-based repository to be replaced with a second software-based repository having features that were not present when the first repository was created. As a further exemplary feature, application program 244 may specify a "type" of repository that it is able and/or willing to work with, where new repositories of that "type" may not be in existence at the time that application program 244 is created, but which may be developed later, thereby further supporting the "renewable" model of security.

It is possible for black box 240 and application program 244 to communicate without decoupling interface 220. For example, application program 244 could authenticate itself directly to black box 240 and could receive directly from black box 240 the enabling bits 824 needed to use object 800. However, the use of decoupling interface 220 is particularly advantageous because it supports the "renewability" of black boxes, as described above. More particularly, since application program 244 only needs to be able to communicate through decoupling interface 220, it does not need to know any of the details about black box 240, such as how to authenticate itself to black box 240, or what communication protocol is used to communicate with black box 240. Thus, black box 240 could be replaced with a different black box 240*a*, with the change being transparent to the developer of application program 244. For example, black box 240*a* may be a different type of black box for use on a different type of remote computer 49 (such as a dedicate rendering device), or, as noted above, it may be a black box 240*a* that incorporates new security technology that had not been developed at the time that black box 240 was provided to remote computer 49, or it may be a hardware-based secure repository. It will be appreciated that the use of decoupling interface 220 enables the use of black box 240*a* with application program 244 and data object 800 even if black box 240*a* has not been developed or is otherwise not yet in existence at the time that application program 244 and data object 800 are installed on remote computer 49.

Figure 9:
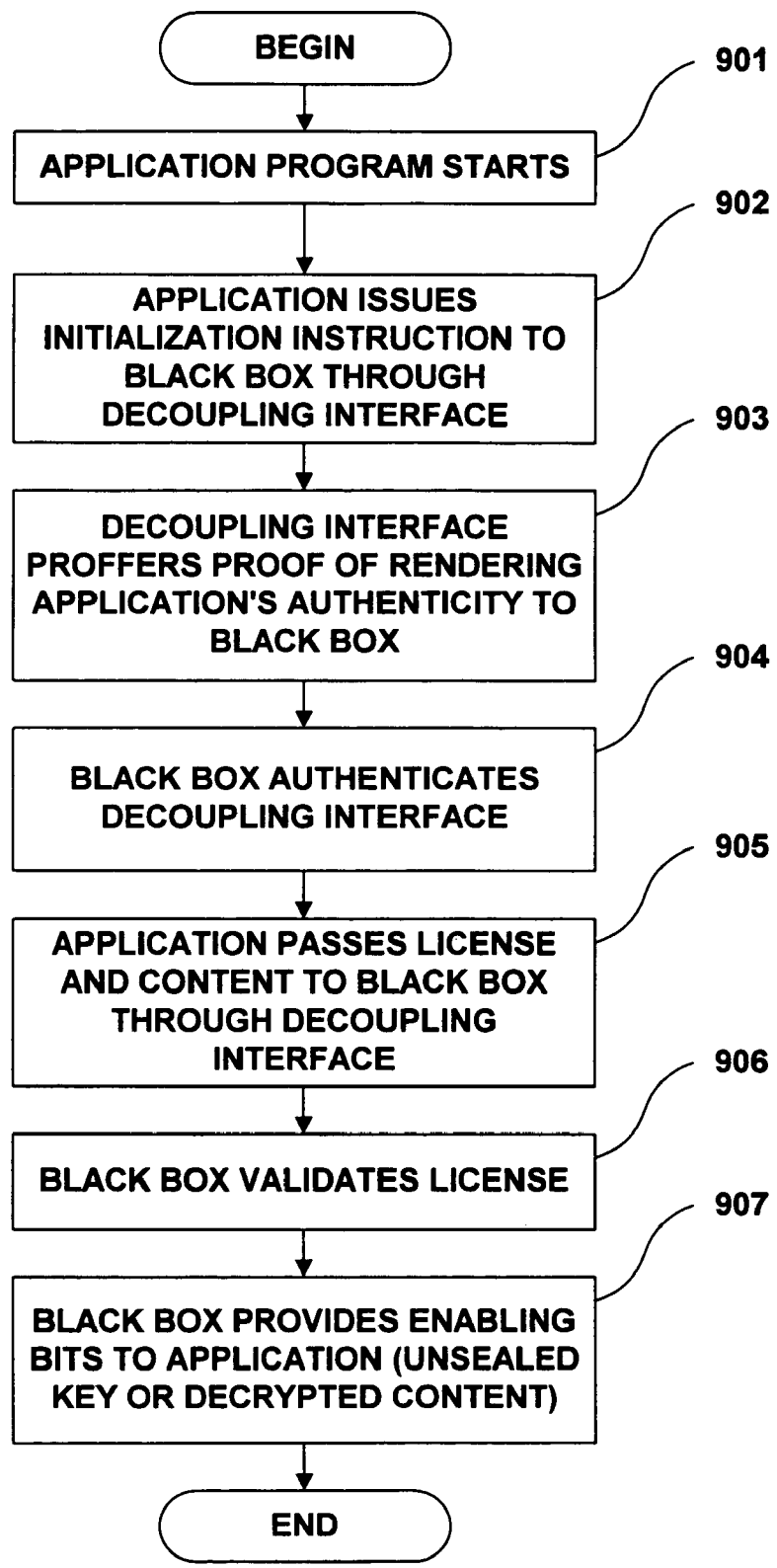
FIG. 9 is a flow diagram showing an exemplary process of using a secure repository.

Referring now to FIG. 9, there is shown an exemplary process by which application program 244 uses black box 240 through decoupling interface 220. At step 901, application program 244 starts execution. Application program 244 may be a program executing on an open platform or general purpose computer, such as remote computer 49. Alternatively, application program 244 may be a program for a closed platform such as purpose-built hardware (not shown). For example, application program 244 may be a program that displays electronically-distributed text to a (human) user. One version of application program 244 may be designed to run on general-purpose open-platform remote computer 49. Another version of application program 244 may be designed to run on a dedicated hand-held reading device that runs no software other than that necessary to display electronic text. Preferably, application program 244 loads decoupling interface 220 (e.g., by linking with a DLL that contains instructions which implement decoupling interface 220), in order to facilitate communication with black box 240.

At step 902, application program issues an instruction to initialize black box 240. Preferably, the initialization instruction is implemented by decoupling interface 220 and takes the form of a method that decoupling interface 220 exposes to application program 244. For example, the code of application program 244 may include an instruction of the form (DecouplingIF::Init( )), which executes code to perform the initialization function (where the code is in the decoupling interface DLL and linked to application program 244 at runtime). The call to Init( ) may, optionally, be parameterized by data representing a type of black box 240 (e.g., if the developer and/or provider of application program 244 has deemed that application program 244 should work only with a particular type of black box, decoupling interface 220 may provided support for such a condition if it is specified as a parameter). Steps 903 and 904, described below, may be performed as part of, or in response to, the initialization instruction issued at step 902.

At step 903, decoupling interface 220 proffers to black box 240 proof of the authenticity and/or trustworthiness of application program 244. The process of authenticating application program 244 generally includes obtaining a certificate from application program 244 (where the certificate is signed with the private key of a trusted certifying authority) and then validating the signature. The certificate may be located in the code of application program 244 in a place known to the DLL that implements decoupling interface 220. Black box 240 preferably incorporates the public key of the certifying authority. The process of authenticating application 244 may be particularly simple when the platform on which application 244 is running is a purpose built device or features hardware-enforced isolation, since it may then be presumed that only trusted applications 244 would be installed on such a device.

At step 904, black box 240 is started and, optionally, is given the opportunity to prepare a secure environment, including authenticating decoupling interface 220 and application program 244. The details of this process depend on the particular environment in which black box 240 and application program 244 are running. For example, in the case of a closed, purpose built device, the only actions that may need to take place are retrieving a private key from a ROM and validating its certificate.

In the case of "authenticated boot" environments, the process may include using an operating system call to check a software image (e.g., of the decoupling interface 220 DLL), checking the certificate of application program 244, and isolating the code and data space of application program 244.

In the case of an open platform, such as where application program 244 runs on a typical personal computer using one of the MICROSOFT WINDOWS 95/98/NT/2000 operating systems, the process of authenticating decoupling interface 220 and preparing a secure environment may include the following actions. The initialization call of decoupling interface 220 (i.e., DecouplingIF::Init( )) may cause the code in decoupling interface 220's DLL to issue an initialization call exposed by black box 240 (e.g., BlackBox::Init). Preferably, one of the arguments to BlackBox::Init may be a binary certificate that contains a cryptographic hash of the code of decoupling interface 220 signed by the private key of a certifying authority, where the corresponding public key is available to (e.g., inside) black box 240. Black Box 240 reads the code of decoupling interface 220, for example by using the system call ReadProcessMemory (or a private in-process protocol that accesses the address space of decoupling interface 220), and computes its hash and compares it to the one signed by the certifying authority. BlackBox::Init may also check that the return address from its Init call is in the execution space of decoupling interface 220. Decoupling interface 220 may also receive two additional certificates from black box 240: a certificate from a certifying authority (which may or may not be the same certifying authority that signs the certificate of decoupling interface 220) binding the name and public key of the developer of application program 244, and also a binary certificate from the developer of application program 244 naming the hash, security level and expiration of its code. Decoupling interface 220, which is in the same address space as application program 244, computes the hash of the application code, verifies the certificate and compares the computed hash to the signed hash. These action may be performed before decoupling interface 220 returns from the initialization call issued by application program 244.

Additionally, during the call to BlackBox::Init, black box 240 preferably attaches to application program 244 using the DebugActiveProcess system call (or similar call, when an operating system other than one of the MICROSOFT WINDOWS operating systems is being used), which has the advantageous effect of preventing user mode debuggers from attaching to application program 244. Preferably, no sensitive code within black box 240, and no key within the black box 240 (e.g., key 248) are "uncovered" until this attachment is done, internal black box integrity checks are performed, and the code of application program 244 and/or decoupling interface 220 have been authenticated. Thereafter, all sensitive data is "poked" into the application process (using WriteProcessMemory, or a private in-process interface that accesses the address space of the application process) and does not travel via COM, RPC or system buffers.

Preferably, in order to establish a secure environment, system components used by black box 240, decoupling interface 220, and application program 244 are also authenticated. Components to be authenticated may include user libraries, kernel components, or any other software that has the potential to affect the security of the environment in which protected actions are to be performed.

At the conclusion of step 904, establishment of a chain of trust between black box 240 and application program 244 is complete. Black box 240 may now proceed to perform sensitive functions, such as cryptographic services, for application program 244.

At step 905, application program 244 requests services from black box 240. For example, black box 905 may provide or identify data object 800 and request that that data object 800 be decrypted if permitted by license 816. In the case where decoupling interface 220 is present, application program 244 may make this request through decoupling interface 220, which then issues the necessary instructions to black box 240.

At step 906, black box 240 performs functions necessary to validate license 816 and provide application program 244 with access to data object 800. For example, in the exemplary architecture depicted in FIG. 8 where license 816, key 820, and content 204 are cryptographically "sealed" together, black box 240 may use its (preferably hidden) private key 248b to decrypt private key 808 of certificate 812, and then may use private key 808 to unseal data object 800 and read its license 816. Black box 240 may then proceed to evaluate license 816, checking whatever conditions are necessary to perform the evaluation. For example, license 816 may permit decryption of data object 800 up to a particular date, in which case the license evaluation process includes checking a (preferably trusted) calendar source. As another example, license 816 may permit data object 800 to be used only in a particular environment (e.g., the license may permit data object 800 to be used on an isolated hardware device but not on an open platform), in which case the evaluation process includes the act of identifying the environment.

If the license permits use of data object 800, black box 240 may obtain sealed key 820 and use it to provide "enabling bits" 824 to application program 244 at step 907. In one exemplary embodiment, enabling bits 824 may include sealed key 820, which application program 244 uses to object 800's encrypted information 204. In another exemplary embodiment, black box 240 uses sealed key 820 to convert encrypted information 204 into decrypted information 208 and then provides decrypted information 208 to application program 244. In the latter example, the decrypted information itself is the "enabling bits" 824. When decoupling interface 220 is present, black box 240 preferably provides enabling bits 824 to application program 244 through decoupling interface 220.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

APPENDIX A

Background

Let e be the exponent to be computed.

Let $e_{acc}$ be the exponent of the "accumulation," the number that accumulates the message raised to e.

Let $e_{err}$ be the current error exponent.

When using the binary method to compute an addition chain, e is scanned from left to right. For each scanned bit, the accumulation is squared, which doubles its exponent (the shift stage: $e_{acc}=e_{acc}<<1$). If the scanned bit is 1, the accumulation is then multiplied by the message, which increases its exponent by 1 (the add stage: $e_{acc}=e_{acc}+1$). This process may be characterized as shifting the MSB off e and on to $e_{acc}$. The add stage effectively corrects the exponent error that accumulated when the exponent was left shifted.

The m-ary method generalizes this method by shifting m bits at a time ($e_{acc}=e_{acc}<<m$). At each step, the exponent error that is corrected in the add stage equals the m-bit number currently being scanned ($e_{err}=e_m$). Usually the error is resolved with one multiply using a pre-computed table of messages raised to all possible m-bit exponents.

In greater generality, when the exponent error is "resolved" by multiplying from a pre-computed table, the exponent in the table is effectively subtracted from the current exponent error (the reduction stage: $e_{err}=e_{err}-e_t$). In the binary and m-ary methods, the reduction exponent is always chosen to equal the current error, so that the reduction always yields an error of zero ($e_t=e_m$). However, a random exponent could be chosen to reduce the error as long as it was less than or equal the current error. The excess error would be carried into the next shift stage ($e_{err}=(e_{err}<<m)+e_m$).

Random Addition Chains:

A library of functions (e.g., Addchain.{h,cpp}) can be created which describe a class that computes a random addition chain for a big number exponent. Computation of the addition chain assumes a storage mechanism, the "register store," that holds several big numbers (typically 15) and the original message. These registers store the message raised to various 29-bit exponents as well as the number that accumulates the message raised to the total exponent (the accumulation).

The register store is primed with random exponents computed using random multiplications between already computed exponents, starting with the original message in one of the registers. While accumulating e, multiplications between random registers are performed and stored, so that "pre-computed" exponents are constantly changing. These random multiplications are tuned so that register exponents do not exceed 29 bits.

While accumulating, the exponent error is not allowed to grow more than twice as large as the largest exponent in the register store. If this limit is about to be exceeded, the error is reduced. These "required" reductions prefer larger exponents to keep the number of required multiplies small. "Optional" reductions randomly occur if there exists any register that is less than or equal the current error. The parameters for these required and optional reductions are tuned so that about 700 multiplies occur for a 512-bit exponent in addition to the 512 necessary squarings—about 3 reductions for every 2 shifts.

Since squarings are treated as multiplies, reductions are fairly unpredictable, and extraneous multiplies frequently occur, an opponent must track the contents of all the registers to determine the accumulating exponent.

Register Store:

Two categories of techniques are used to make it difficult to track the contents of a virtual register: data obfuscation and engineering tricks. Data obfuscation involves storing registers redundantly, swapping data stored in two registers, and hiding data by XOR'ing it with another register. Engineering tricks help defeat common techniques used for backwards engineering code, such as fall through cases on switch statements or extraneous no-op calculations injected between real calculations.

Data Obfuscation:

The register store contains 66 "real" registers that are used to store data for the 16 "virtual" registers used by the addition chain calculation. A virtual register can keep track of up to 4 redundant copies of its data with 4 "slots" that reference real registers. When data needs to be stored, a real register is randomly selected from the set of unallocated registers. Real registers are released to the unallocated store when a virtual register is overwritten. Dynamically allocating real registers to a virtual register prevents an adversary from statically examining data stored at particular memory offsets to determine the contents of the virtual register.

When data is needed, one of the slots is randomly selected. Duplicating data for redundancy is scheduled randomly, but the process is biased to prefer data that has been used recently (ex. as a source or result of a multiply). Slots are sometimes released randomly, even though the data in the real register is not changed and might appear to be in use. This way, a virtual register's data may actually appear in more than 4 real registers even though the system is only selecting data from one of the 4 slots it is tracking.

In the process of copying data, a real register may also become XOR'd with another random real register, to mask its contents. The other register may or may not contain data that is being actively used. In fact, a copy operation may change the XOR state of up to four other registers, in addition to the real registers being copied to and from. These six registers can also swap their contents in various ways during a copy via a series of XOR's. Thus, a particular copy generally involves several XOR's that can change both the XOR state of several real registers and the real registers referenced by virtual register slots.

Dynamic register allocation, surreptitious swapping, and XOR'ing constitutes a kind of "shell game," where data is being shuffled around and masked in memory before and after virtually every multiplication. Data stored in one register may be retrieved from an entirely different register later on. The same register may never be used to retrieve the same piece of data twice in a row. The XOR'ing makes it more difficult to track the swapping in memory.

Engineering Tricks

Static analysis of the register store's memory is deterred in three ways. Memory is allocated on the heap so techniques that examine offsets from the stack pointer do not work. Random blocks of unused space are also added between real registers so that obvious offsets cannot be used to examine a particular register. Finally, the register store is initialized with random content so that unused or unprimed registers are not obvious by examination.

The bulk of the code in rsagen.cpp is devoted to generating the _Copy function, and tracking the state changes that it performs as side effects. The _Copy function performs the copy/swap/state-change operation for the data in the register store. A single 32-bit unsigned integer is passed to _Copy that encodes the type of copy that is to occur. Part of this UINT encodes the 6-8 real registers involved in the copy/swap/state-change, and another part performs the actual calculation. Both of these parts are implemented with large switch statements (150+ cases) that make extensive use of fall through cases. Fall through makes it more difficult to analyze the code generated for the switch based on jumps, since 1 to 4 cases may use the same break.

The major vulnerability of the system up to this point involves a dynamic attack, where the adversary breaks out of execution at each multiply and examines the data going in and out. If the adversary knows what exponent is represented by the source data, it can compute the exponent of the result. Since the whole system starts with the original message, the adversary could backwards engineer any exponent using this attack—most notably the secret exponent.

This is deterred in two ways. First, data for the sources and result of the multiply are directly read from and written to the register store, without making an intermediate copy to stack memory. This makes it more difficult for an automatic breaker to analyze the stack frame to infer exponents. Second, a percentage of the calculations are performed using inlined copy cases and multiplies. These inlined calculations mostly occur at the beginning of the computation, but other clusters are scattered throughout the calculation randomly. With copies and multiplies mixed together, it should be more difficult to determine where exactly a multiply is occurring and therefore where to examine data to backwards engineer exponents.

Vulnerability and Possible Solution:

Currently, the greatest vulnerability of the system is still the dynamic attack. If an adversary can infer where multiplies are occurring in the inlined code, it might still backwards engineer the exponents automatically. This will be difficult with BBT code shuffling and bogus code injected into the real calculations—but it is still conceivable.

A number theory result could be used to make this more difficult. If during a copy, the code performed a surreptitious add much like the swaps and XOR's, the code could mask a source value of the multiply. After the multiply, a second number is added to the result, such that the total amount added is congruent to zero with respect to the modulus.

Given $(A+B) \bmod N=0$, it is needed to hide the sources and result of the multiply:

$(X*Y) \bmod N =$ $(X*Y+(A+B)*Y) \bmod N =$ $(X*Y+A*Y+B*Y) \bmod N =$ $((X+A)*Y+B*Y) \bmod N$ So, add A to X before the multiply, and $(B*Y) \bmod N$ after the multiply. It is possible to add $(B*Y) \bmod N$ after the mod—as long as the 512-bit number does not overflow with the add, and as long as another mod is done before the end. The copy code is designed to support a surreptitious add, although this new kind of state is not implemented in the state tracking code.

What is claimed is:

1. A method of generating a computer program storable on a computer-readable medium, said method comprising the acts of:

identifying a set of actions that are performed in the course of using a cryptographic algorithm to apply a cryptographic key to first data;

identifying attributes of said cryptographic key corresponding to said set of actions;

generating a first set of computer-executable instructions which includes instructions to perform actions functionally equivalent to said set of actions using said attributes but not said cryptographic key;

including said first set of computer-executable instructions in said computer program, wherein said computer program is operable to perform said functionally equivalent actions without access to, storing in memory, or exposing a whole or segment of said cryptographic key.

2. The method of claim 1, wherein said cryptographic algorithm is a public/private-key algorithm.

3. The method of claim 2, wherein said cryptographic key is the private key of an asymmetric key pair.

4. The method of claim 1, further comprising the act of receiving second data which in some way identifies or relates to a computing device on which said computer program runs, and wherein said first set of computer-executable instructions is based on said second data.

5. The method of claim 4, wherein said second data comprises or is based on one or more of the following: a CPUID associated with a processor of said computing device; a serial number associated with said processor; and third data which identifies a hard disk associated with said computing device, said third data being assigned to said hard disk by a manufacturer or distributor of said hard disk.

6. The method of claim 4, wherein said first set of computer-executable instructions comprises one or more instructions which depend for their correct execution on retrieval, during execution, of said second data.

7. The method of claim 1, further comprising the act of randomly or pseudo-randomly generating a number, wherein said first set of computer-executable instructions is based on said number.

8. The method of claim 1, further comprising the acts of:
generating a diversionary second set of computer-executable instructions which perform one or more second actions; and
including said second set of computer-executable instructions in said computer program.

9. The method of claim 8, further comprising the act of retrieving said diversionary second set of computer-executable instructions from a database of stored code.

10. The method of claim 8, wherein said computer program does not rely on performance of said second actions to apply said cryptographic key to said first data.

11. The method of claim 1, further comprising the act of generating a second set of computer-executable instructions which detects modification or deletion of at least a portion of code contained in said computer program, and which restores said portion if said portion has been deleted or modified.

12. The method of claim 1, further comprising the act of reorganizing at least some code contained in said computer program.

13. The method of claim 1, further comprising the acts of:
delimiting a segment of at least some code contained in said computer program;
obtaining a first hash of the code inside the delimited segment;
including said first hash of the delimited segment within said computer program;
creating a second set of computer-executable instructions which obtains a second hash of the delimited segment and which compares said second hash with said first hash; and
including said second set of computer-executable instructions in said computer program.

14. The method of claim 1, further comprising the acts of:
encrypting at least a portion of said first set of computer-executable instructions; and
creating a second set of computer-executable instructions which decrypts said portion.

15. The method of claim 1, wherein said act of creating said first set of computer-executable instructions comprises the acts of:
creating instructions in a source-level language; and
compiling said source-level-language instructions.

16. The method of claim 15, further comprising the act of postprocessing the compiled instructions after said compiling act, wherein said postprocessing act comprises one or more of the following: encrypting at least a portion of the compiled instructions, and hashing at least a portion of the compiled instructions.

17. The method of claim 1, further comprising the acts of:
receiving, from a computing device, a request for said computer program via a network; and
providing said computer program to said computer device via said network.

18. The method of claim 17, wherein said network comprises the Internet.

19. The method of claim 17, wherein said receiving act occurs contemporaneously with said providing act.

20. The method of claim 1, wherein said generating act comprises retrieving instructions from a database of stored code.

21. A computer-readable medium encoded with a third set of computer-executable instructions to perform the method of claim 1.

* * * * *